United States Patent [19]

Sakata

[11] Patent Number: 4,905,098
[45] Date of Patent: Feb. 27, 1990

[54] COPIER WITH AN OPTIONAL FACSIMILE FUNCTION AND METHOD OF CONTROLLING THE SAME

[75] Inventor: Seiji Sakata, Yokohama, Japan

[73] Assignee: Ricoh Company, Ltd., Tokyo, Japan

[21] Appl. No.: 191,393

[22] Filed: May 9, 1988

[30] Foreign Application Priority Data

May 9, 1987 [JP] Japan .................................. 62-113075
Apr. 1, 1988 [JP] Japan .................................. 63-78157

[51] Int. Cl.$^4$ ............................................. H04N 1/32
[52] U.S. Cl. .................................... 358/468; 358/476; 358/496; 358/493
[58] Field of Search ............... 358/257, 256, 280, 286, 358/293, 400, 468, 476, 496, 498, 441; 355/14 R

[56] References Cited

U.S. PATENT DOCUMENTS 4,502,080 2/1985 Tsuda .................................. 358/256
4,567,322 1/1986 Tsuda .................................. 358/256
4,719,516 1/1988 Nagashima ......................... 358/280

Primary Examiner—Edward L. Coles, Sr.
Attorney, Agent, or Firm—Oblon, Spivak, McClelland, Maier & Neustadt

[57] ABSTRACT

A copier with an optional facsimile mechanism and a method of controlling such a copier. A person can easily and efficiently switch the operation mode of the copier from a copy mode to a facsimile mode and from the facsimile mode to the copy mode.

14 Claims, 30 Drawing Sheets

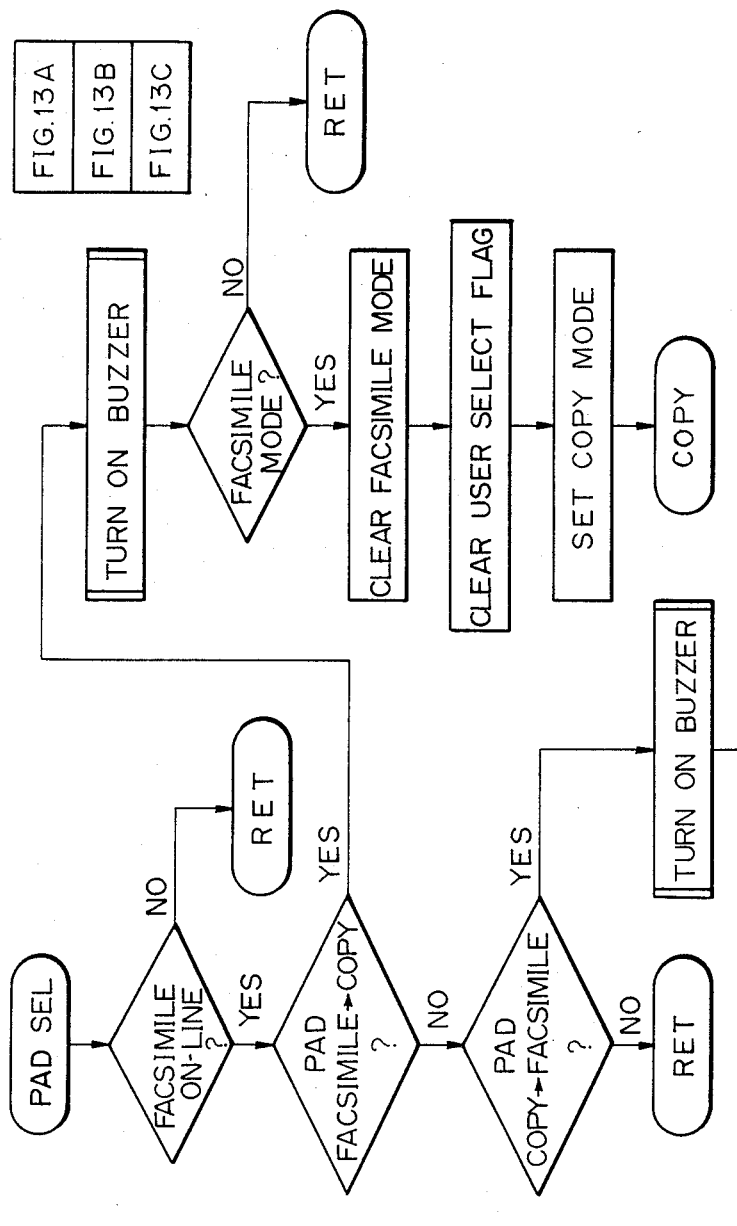

COPIER WITH AN OPTIONAL FACSIMILE FUNCTION AND METHOD OF CONTROLLING THE SAME

BACKGROUND OF THE INVENTION

The present invention relates to a copier with which a facsimile mechanism may be combined as desired and a method of controlling the same and, more particularly, to the changeover between a copy and a facsimile mode of such a copier.

Implementations for combining a facsimile transceiver and a copier have heretofore been proposed. A drawback with the prior art implementations is that a complicated operation is needed to switch a copy mode to a facsimile mode or vice versa, limiting the efficiency of the combined facsimile and copier apparatus.

SUMMARY OF THE INVENTION

It is therefore an object of the present invention to provide an efficient copier with an optional facsimile function and a method of controlling the same.

It is another object of the present invention to provide a generally improved copier with an optional facsimile function.

A copier with an optional facsimile function of the present invention comprises a pressable mode selecting switch, slidable mode selecting means, and control means for controlling the mode selecting switch and mode selecting means such that when either one of the switch and means is operated, a transition from a copy mode to a facsimile mode or a transition from the facsimile mode to the copy mode occurs.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
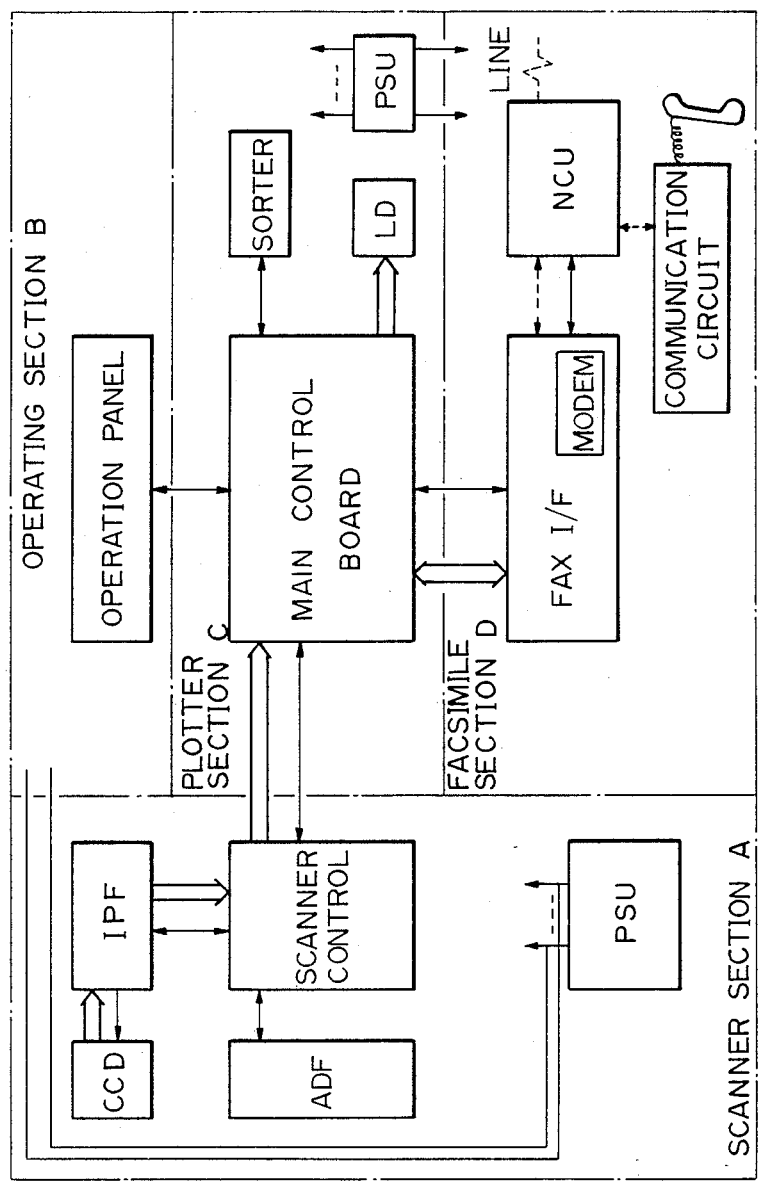
FIG. 1 is a schematic block diagram showing a copier in accordance with the present invention and with which a facsimile mechanism is combined.

Referring to FIG. 1 of the drawings, a copier embodying the present invention and with which a facsimile mechanism is combined is shown in a block diagram. As shown, the combined copier and facsimile apparatus is generally constituted by a scanner section A, an operating section B, a plotter section C, and a facsimile section D.

The scanner section A includes a scanner controller, a charge coupled device (CCD) image sensor, and an automatic document feeder (ADF). The operating section B includes an operation panel which will be described. The plotter section C includes a main control board for controlling the operation of the entire apparatus, a sequence control board for controlling the sequence from paper feed to paper discharge, and a sorter. Further, the facsimile section D includes a facsimile interface and a communication circuit.

Figure 2:
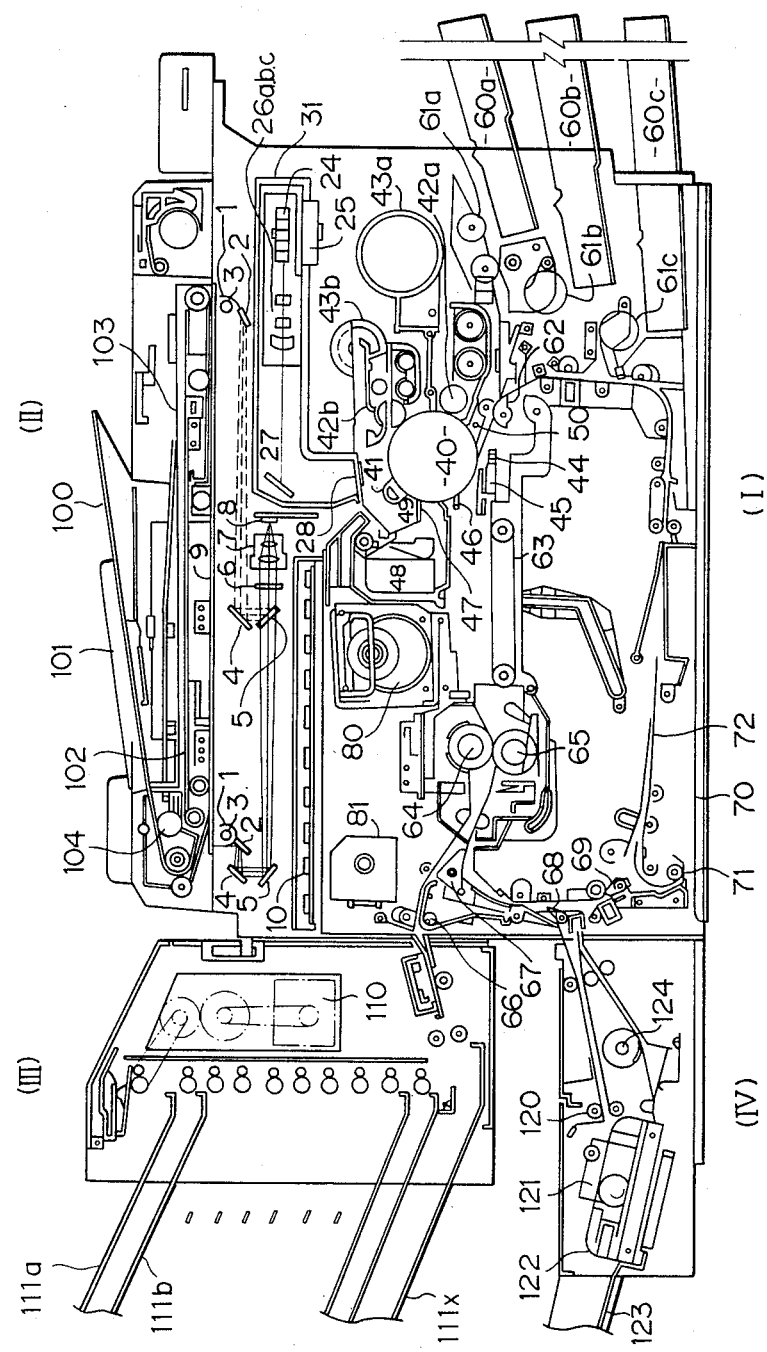
FIG. 2 is a schematic view showing only the copier of the combined apparatus as shown in FIG. 1.
Figure 3:
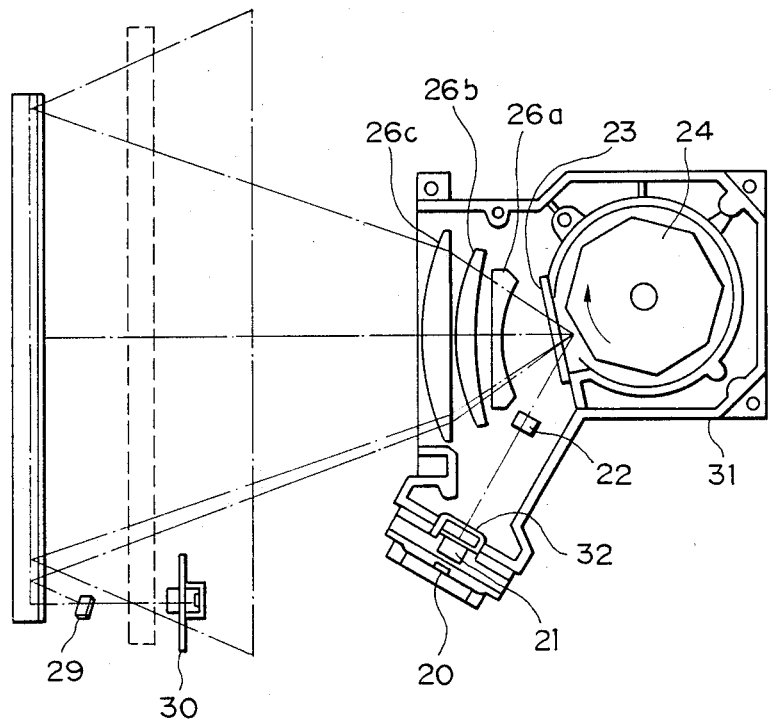
FIG. 3 is a plan view of a writing section of the copier.

Referring to FIGS. 2 and 3, a specific construction of a digital copier which serves as the copier of the present invention is shown. As shown in FIG. 2, the digital copier is made up of four units, i.e., a copier body (I), an ADF (II), a sorter (III), and a two-side reversal unit (IV). The copier body (I) includes a scanner section, a writing section, a photoconductive element section, a developing section, and a sheet feed section which are constructed and operated as follows.

[Scanner Section]

A first scanner having a mirror 1, a light source 3 and a first mirror 2 is movable at a predetermined speed. A second scanner is movable at half the speed of the first scanner and provided with a second mirror 4 and a third mirror 5. The first and second scanners optically scan an original document, not shown, which is laid on a glass platen 9. Imagewise light from the document is incident to a lens 7 via a color separating filter 6 and then focused onto a one-dimentional solid state imaging device 8.

While the light source may be implemented with a fluorescent lamp, halogen lamp or the like, use is commonly made of a fluorescent lamp which has stable wavelength and long service life. Although one light source 3 is used in the illustrative embodiment, two or more light sources 3 may be used as desired. Since imaging device 8 has a constant sampling clock, a fluorescent lamp has to be turned on at a higher frequency than the sampling clock in order to eliminate adverse influence on an image.

Usually, the imaging device 8 is implemented by a CCD. An image signal read by the imaging device 8 which is an analog signal is converted into a digital signal and then subjected to various kinds of image processing (binarization, tone processing, magnification change, edition, etc.) at an image processing board 10 to become a digital signal in the form of congregation of spots.

In this particular embodiment, the color separating filter 6 is movable into and out of an optical path which extends from the document to the imaging device 8 for the purpose of transmitting only the information associated with a necessary color. While the document is scanned, the filter 6 is moved into and out of the optical path to selectively enable a multi-transfer function, a two-side copy function and other various functions to produce a variety of kinds of copies as desired.

[Writing Section]

The image data undergone image processing are written on a photoconductive drum 40 in the form of congregation of light spots by raster scanning which uses a laser beam. While the laser beam may be implemented by a helium-neon (Ne-Ne) laser which has a wavelength of 633 nanometers and well matches to the sensitivity of a photoconductive element of a copier, it is very expensive and cannot be modulated without resorting to the intermediary of a complicated arrangement. In the illustrative embodiment an inexpensive and directly modulatable semiconductor laser is used taking account of the recent improvement int he sensitivity of a photoconductive element.

In FIG. 2, light issuing from a semiconductor laser 20 is collimated into a parallel beam by a collimating lens 21 and then shaped by an aperture 32 to become a beam having a predetermined shape. This beam is compressed in the subscanning direction by a first cylindrical lens 22 and then directed toward a polygon mirror 24. Having an accurate polygonal cross-section, the polygon mirror 24 is rotated by a polygon motor 25, FIG. 2, at a predetermined speed in a predetermined direction. The rotation speed of the mirror 24 is determined on the basis of the rotation speed and writing density of a photoconductive drum 40 as well as the number surfaces of the polygon mirror 24.

The laser beam incident to the polygon mirror 24 is deflected by the mirror 24 toward f-theta lenses 26a, 26b and 26c. Functions assigned to the f-theta lenses 26a to 26c are scanning the drum 40 at a constant rate by the laser beam whose angular velocity is constant, focusing the light beam onto the drum 40 such that the beams forms a minimum light spot, and compensating for tilting.

In a position outside of an image area, the laser beam coming out from the f-theta lenses 26a to 26c is reflected by a mirror 29 to reach a synchronization sensor 30. When a predetermined period of time expires since the synchronization sensor 30 has produced a synchronization signal representative of a head signal int he main scanning direction, one line of image data are delivered. This procedure is repeated thereafter to complete one full image.

[Phtotconductive Element Section]

The photoconductive drum 40 has a photoconductive layer on its outermost periphery. In this embodiment, the photoconductive layer is implemented by an organic photoconductor (OPC) which is sensitive to the wavelength of 780 nanometers of a semiconductor layer, e.g. $\alpha$-Si or Se-Te. As regards laser writing, while a negative/positive (N/P) process for illuminating an image area and a positive/positive (P/P) process for illuminating a background area are available, this embodiment uses the N/P process.

A charger 41 is provided with a grid adjacent to the drum 40 and uniformly charges the surface of the drum 40 to negative polarity. The laser beam illuminates an image area of the drum surface to lower its potential. As a result, a latent image is electrostatically formed in which the potential is about $-750$ volts to $-800$ volts in a background area and about $-500$ volts in an image area. A bias voltage of $-500$ volts to $-600$ volts is applied to a developing roller of any of developing units 42a and 42b to deposit negatively charged toner on the latent image, whereby the latent image is converted into a toner image.

[Developing section]

A main developing unit 42a and an auxiliary developing unit 42b are used in the illustrative embodiment. In a black-and-white reproduction mode, the auxiliary developing unit 42b and a toner container 43b associated therewith are removed. Specifically, a toner container 43a associated with the main developing unit 42a and the toner container 43b associated with the auxiliary developing unit 42b store black toner and color toner, respectively. The developing units 42a and 42b are selectively conditioned for development by, for example, changing the position of a main pole of one developing unit while the other developing unit is operated. This kind of development may be combined with the operation of the filter 6 and a multiple transfer function and a two-side copy function of a paper transport system in order to produce various kinds of color copies while editing color image data. Development in three or more colors may be implemented by three or more developing units which are fixedly arranged around the drum 40 or angularly movable to selectively reach a developing station.

The toner image produced by any of the developing units 42a and 42b is charged by a transfer charger 44 from behind to positive polarity and thereby transferred to a paper which is fed in synchronism with the rotation of the drum 40. The paper with the toner image is subjected to AC discharge by a separation charger 45 which is held integrally with the transfer charger 44, whereby it is removed from the drum 40. Toner remaining on the drum 40 without being transferred tot he paper is scraped off from the drum 40 by a cleaning blade 47 and then collected in a tank 48. Further, the potential pattern remaining on the drum 40 is erased by a discharging lamp 49.

A photosensor 50 is located immediately after the developing station. Constituted by a light-emitting element and a light-sensitive element, the photosensor 50 is adapted to measure the image density in terms of a ratio between the reflectivity of a pattern portion and that of the other portion which are defined on the drum 40 by writing a predetermined pattern (black pattern or dot pattern) in a position corresponding to the photosensor 50 and developing it. When the image density measured is low, the photosensor 50 produces a toner supply signal. That the density does not increase even after the supply of toner may show that the remaining amount of toner is short.

[Paper Feed Section]

In this embodiment, the paper feed section includes a plurality of cassettes 60a, 60b and 60c. A paper with a toner image may be routed through a re-feed loop 72 for producing a two-sided copy or for feeding it again. When any of the cassettes 60a to 60c is selected and then a start button is depressed, a feed roll 61 (61a, 61b or 61c) is rotated to feed a paper until the paper abuts against a register roller 62 which is in a halt then. Timed to an image position on the drum 40, the register roller 62 begins to rotate to drive the paper to feed the paper toward the periphery of the drum 40. After the toner image has been transferred from the drum 40 to the paper at a transfer station, the paper is transported by a separation and transport section 63 to a fixing roller pair which is constituted by a heating roller 64 and a pressing roller 65, the fixing roller pair fixing the toner image on the paper.

In a usual copy mode, the paper with the toner image fixed thereon is directed by a pawl 67 toward an outlet which adjoins the sorter (III). In a multi-copy mode, the paper is guided by the separator pawl 67 downward and, without being redirected by other selector pawls 68 and 69, routed through the loop 72 to reach the register roller 62 again. A two-side copy mode may be selectively effected by the copier body (1) only or by the copier body (I) and the two-side reversal unit (IV). When only the copier body (I) is used, the paper directed downward by the selector pawl 67 is fed further downward by the pawl 68 and then guided by the pawl 69 toward a try 70 which is located below the loop 72. Then a roller 71 is actuated to return the paper toward the selector pawl 69 which, at this time, is oriented to guide the paper into the loop 72, so that the paper reaches the register roller 62.

[ADF]

The ADF (II) serves to automatically feed original documents one by one onto the glass platen 9 and then discharge them after they have been scanned. Specifically, documents stacked on a feed tray 100 are positioned in the widthwie direction by using a side guide 101. A feed roll 104 feeds one document at a time from the stack on the feed tray 100 and then a belt 102 transports the document to a predetermined position on the glass platen 9. After a desired number of copies have been produced, the belt 102 is actuated again to discharge the document to a discharge tray 103. The size of the document may be detected by sensing the position of the side guide 101 selected and counting the feed time.

[Sorter]

The sorter (III) is usable to distribute copies coming out of the copier body (I) to bins 111a to 111x in a manner well known in the art. By a plurality of rollers which are rotated by a motor 110, the copies are distributed to selected ones of the bins 111a to 111x depending upon the positions of pawls which are individually located in the vicinity of the bins.

[Two-Side Reversal Unit (IV)]

The two-side reversal unit (IV) helps the copier body (I) produce multiple two-sided copies collectively. Specifically, papers fed downward by the discharge roller 66 are guided by the pawl 167 into the two-side reversal unit (IV). In the unit (IV), the papers are sequentially stacked on a tray 123 by a discharge roller 120 while being positioned by a feed roller 121 and a side guide 122. The papers on the tray 123 are sequentially fed out of the unit (IV) by a re-feed roller 124 when the timing for copying a document on their back is reached. At this instant, the papers are directly driven into the loop 72 by the pawl 69 and therefrom to the register roller 62. Further shown in FIGS. 1 and 2 are a glass 23 for insulating sound, a mirror 27, a glass 28 for intercepting dust, a main motor 80, and a fan motor 81.

[Electrical Control Section]

Figure 4A:
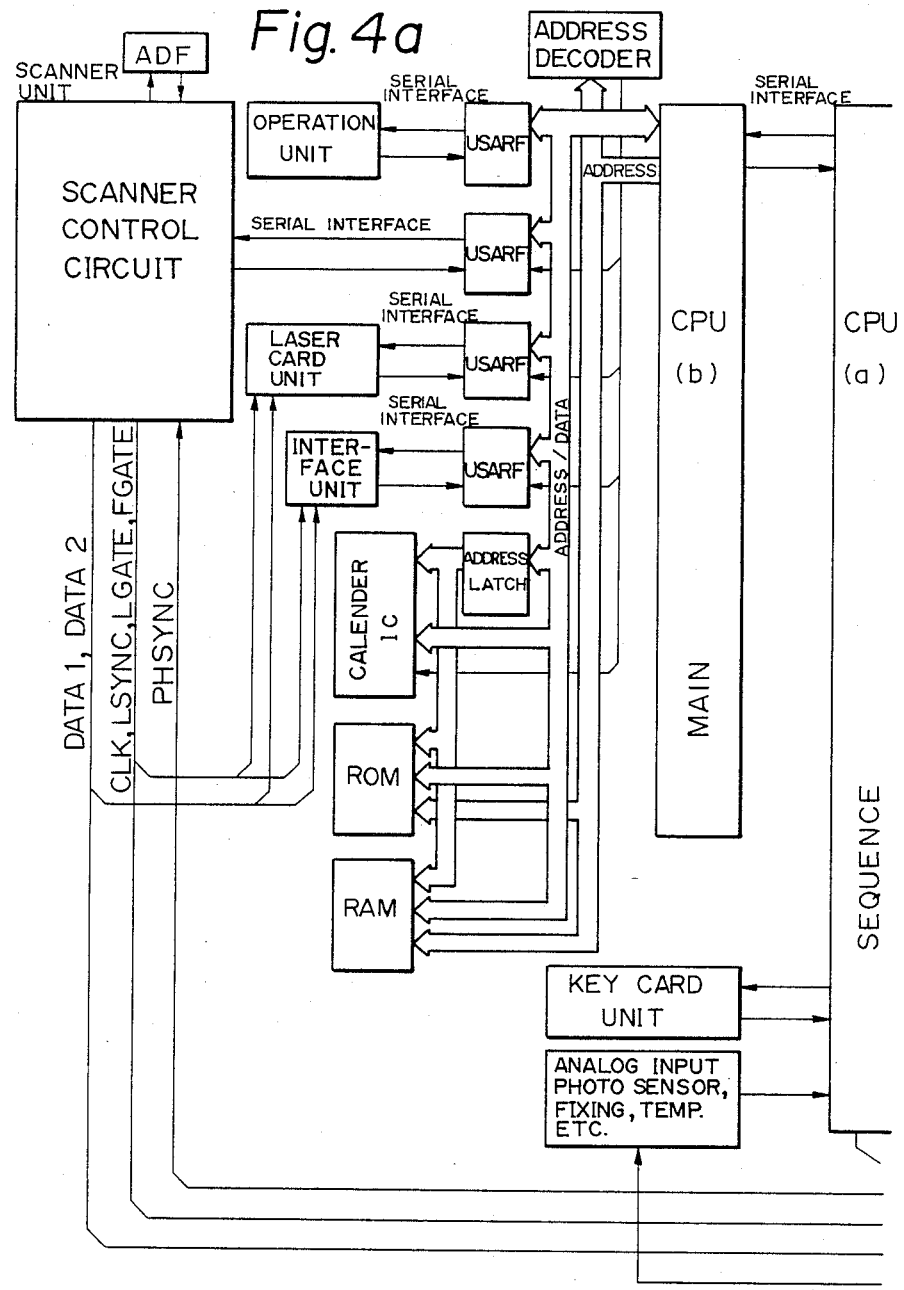
FIGS. 4a and 4b are block diagrams each schematically showing a printer section.
Figure 4B:
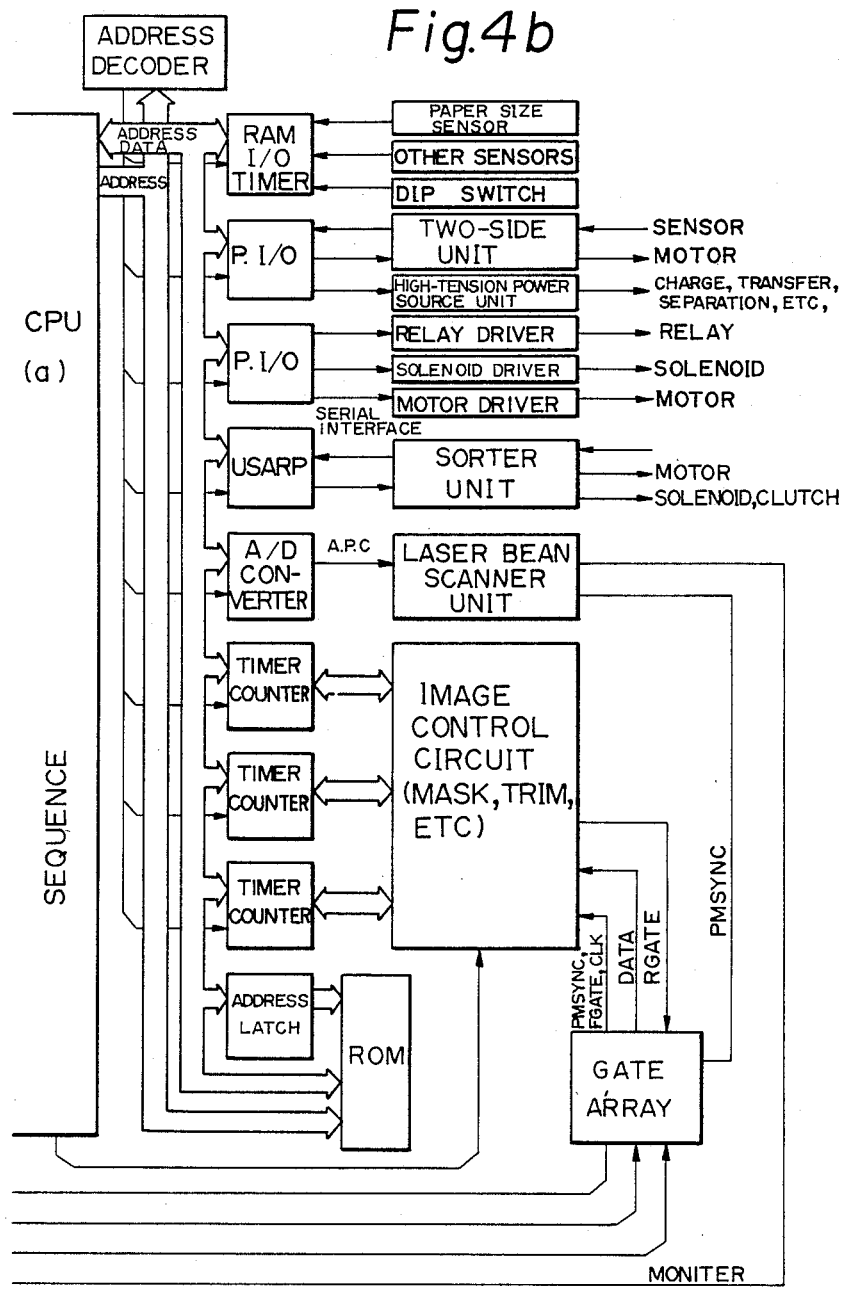

FIGS. 4a and 4b are blocks diagrams which in combination the overall construction of the copier. It is to be noted that a central processing unit CPU (a) is shown in both of FIGS. 4A and 4B to show how the two figures should be combined. A control unit of the copier includes two CPUs (a) and (b) which are assigned to sequence control and operation control, respectively. The CPUs (a) and (b) are interconnected by a serial interface (RS232C).

Sequence control which is associated with paper transport timings will be described first. Connected to the CPU (a) are a paper size sensor, sensors responsive to the discharge, register and others of a paper, the two-side unit, a high-tension power source unit, drivers associated with relays, solenoids, motors and the like, the sorter unit, the laser unit, and the scanner unit. The paper size sensor produces an electric signal by sensing the size and orientation of papers which are loaded in its associated paper cassette. Also connected to the CPU (a) are an oil end sensor, a toner end sensor, a door open sensor, a fuse sensor, etc.

The two-side unit is provided with a motor for regulating the widthwise position of papers, a paper feed clutch, a solenoid for switching a transport path, a paper presence/absence sensor, a home position sensor responsive to the position of a side fence, various sensors associated with paper transport, etc. The high-tension power source unit applies a different predetermined high-tension power to each of the charger, transfer charger, separation charger, and developing electrode. The drivers are associated with a sheet feed clutch, register clutch, counter, motor, toner supply solenoid, power relay, fixing heater, etc. The CPU (a) is connected the sorter unit by the serial interface so that papers may be transported at predetermined timings into the bins in response to a signal from the sequence. Applied to an analog input of the CPU (a) are a fixing temperature, photosensor output, laser diode condition being monitored, and laser diode reference voltage. The fixing temperature is maintained constant by on-off control in response to an output of a thermistor which is installed in the fixing section. As regards the photosensor output, a photosensor pattern produced at a predetermined timing is outputted by a phototransistor so that the CPU (a), based on the density of that pattern, couples and uncouples the toner supply clutch to control the toner density. To maintain the output power of the laser diode, an analog-to-digital (AD) converter and the analog input of the CPU are used. Specifically, the control is such that the voltage monitored when the laser diode is turned on becomes equal to a predetermined reference voltage (which is so selected as to cause the laser diode output power to be 2 milliwatts.

An image control circuit generates various timing signals associated with masking and trimming, erasure and photosensor pattern while delivering a video signal to the laser diode. A gate array functions to convert two-bit parallel image data which are outputted by the scanner into a one-bit serial signal in synchronism with a synchronizing signal PMSYNC which is generated by the scanner unit and a signal RGATE which is representative of a wire start position.

The CPU (b) assigned to the operation control, or main CPU, controls a plurality of serial ports and a calendar integrated circuit (IC). Connected to the serial ports are the operating section, scanner, facsimile transceiver, interface unit and the like as well as the sequence control CPU (a). The operating section includes indicators which are individually representative of the states of keys and the conditions of the copier. While data entered on the keys are serially sent to the CPU (b), the indicators are selectively turned on by serial outputs of the CPU (b). The CPU (b) interchanges data associated with image processing and image reading with the scanner and interchanges preset data with the facsimile section and interface unit. The calendar IC stores date and time so that the copier may be turned on and off based on those data.

Figure 5:
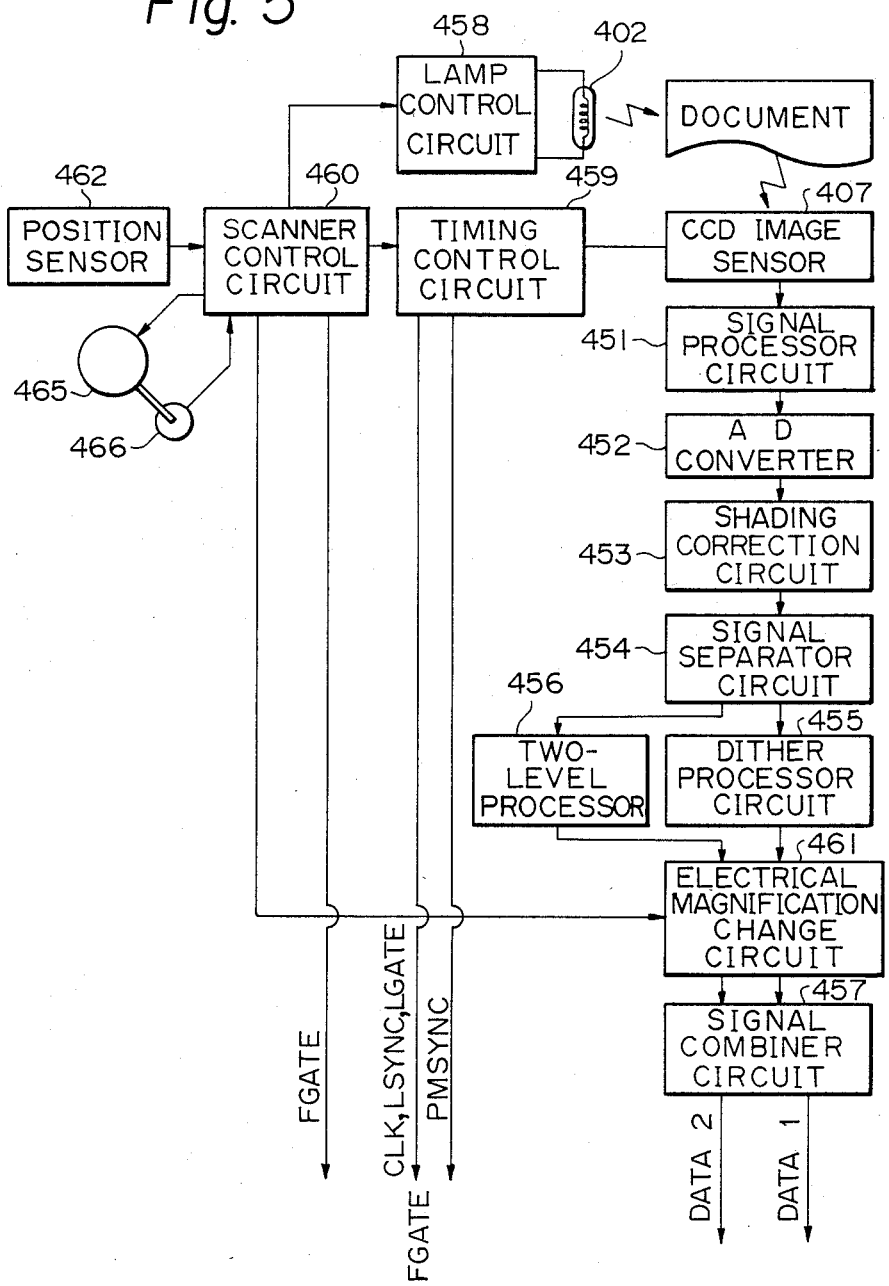
FIG. 5 is a schematic block diagram of an image scanner section.

FIG. 5 is a block diagram of the image scanner section. An analog image signal outputted by a CCD image sensor 407 is amplified by a signal processor circuit 451 and then converted by an AD converter 452 into a multi-level digital signal. This signal is routed to a shading correction circuit 453 and therefrom to a signal separator circuit 454. Processing the input image data, the signal processor circuit 454 separates characters and other two-level image components and halftone image components. While the image components are applied to a two-level processor circuit, or binarizer, 456, the halftone image components are fed to a dither processor circuit 455. Using a predetermined threshold value, the two-level processor circuit 456 converts the input multi-level data into two-level data. The dither processor circuit 455 discriminates the input data by using various threshold values which are predetermined on a scanning point basis, thereby producing two-level data including halftone data. A signal combiner circuit 157 combines the two-level signal outputted by the two-level processor circuit 456 and the two level signal outputted by the dither processor circuit 455 so as to produce signals DATA1 and DATA 2.

A scanner control circuit 460 controls a lamp control circuit 458, a timing control circuit 459, an electrical magnification change circuit 461, and a scanner drive motor 465 in response to commands which are applied therefrom from the printer control section. The lamp control circuit 458 turns on and off the lamp 402 and controls the quantity of light, as commanded by the scanner control circuit 460. A rotary encoder 466 is connected to the output shaft of the scanner drive motor 465, and a position sensor 462 senses a reference position of a subscanning drive mechanism. The electrical magnification change circuit 461 applies electrical magnification change processing to the image data undergone dither processing and the image data undergone two-level processing, on the basis of magnification data which is set by the scanner control circuit 460 and associated with the main scanning.

The timing control circuit 495 produces various signals in response to a command from the scanner control circuit 460. Specifically, as reading begins, the timing control circuit 459 delivers to the CCD image sensor 407 a transfer signal for transferring one line of data and a shift clock adapted to deliver data one bit at a time from the shift register. The timing control circuit 459 delivers to an image reproduction control unit a pixel synchronizing clock CLK, a main scanning synchronizing clocl LSYNC, and a main scanning valid period signal LGATE. The pixel synchronizing clock CLK is substantially the same as the shift clock which is applied to the CCD image sensor 407. While the main scanning synchronizing clock LSYNC is substantially the same as a main scanning synchronizing signal PMSYNC which the beam sensor of the image writing unit produces, it is inhibited from appearing when an image is not read. The main scanning valid period signal LGATE has a (logical) high level, H, when the output data DATA1 and DATA2 are considered valid. In the illustrative embodiment, the CCD image sensor 407 produces 4,800 bits of valid data per line. The data DATA1 and DATA1 are associated with odd pixels and even pixels, respectively.

The scanner control circuit 460 responds to a read start command from the printer control section by turning on the lamp 402, driving the scanner drive motor 465, and controlling the timing control circuit 459 to thereby cause the CCD image sensor 407 to start reading an image. Simultaneously, the scanner control circuit 460 turns a subscanning valid period signal FGATE to a high level. This signal FGATE becomes a low level, L, as a period of time necessary for scanning a maximum reading length (lengthwise dimension of a paper of format A in the illustrative embodiment).

Figure 6:
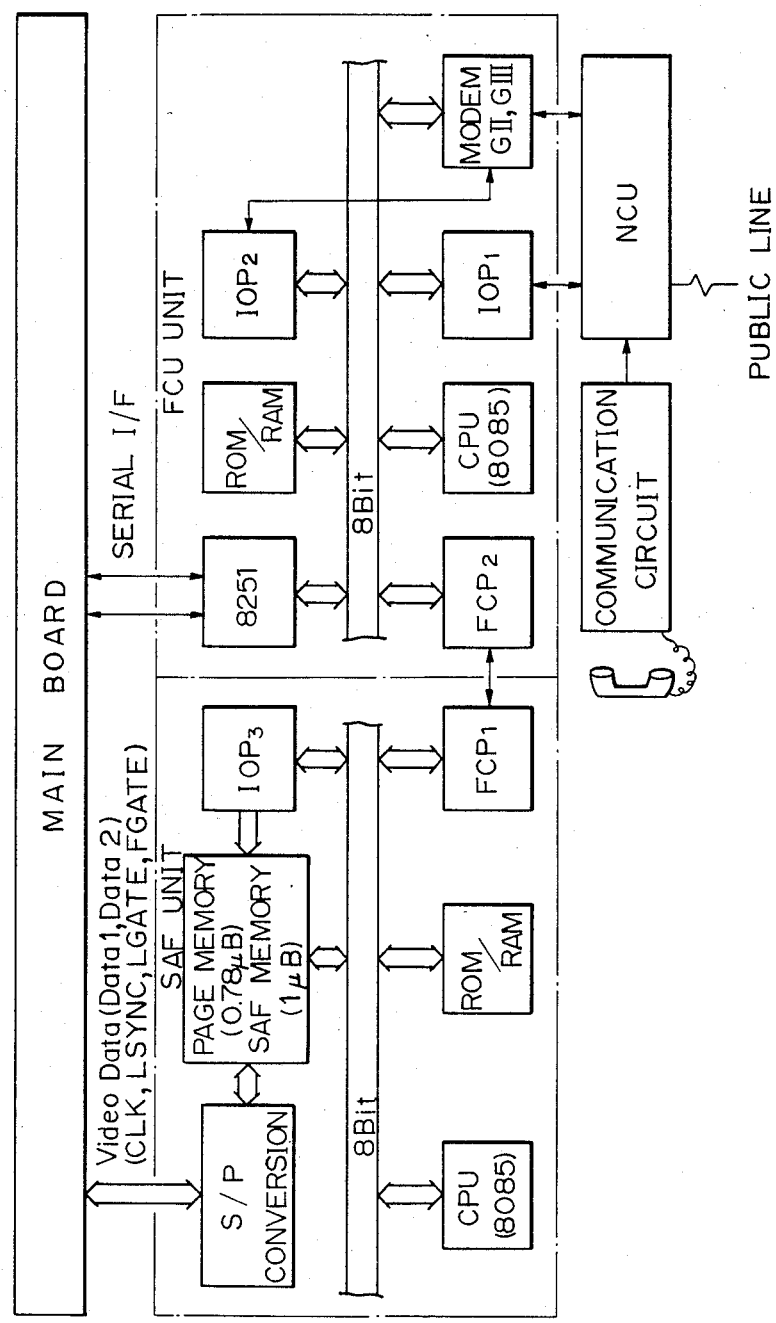
FIG. 6 is a shematic block diagram of a facsimile section.

Referring to FIG. 6, the facsimile section includes a main board, a SAF unit, FCU unit, a network control unit (NCU) which may be modified for a particular destination, a communication circuit, and a telephone. This system is based on memory transmission and reception. Hence, document data are transmitted after being stored in a SAF memory. Likewise, received data are stored int he SAF memory and, when the printer is not occupied, outputted from the SAF memory. The changeover between a copy mode and a facsimile mode will be described in detail later.

Figure 7:
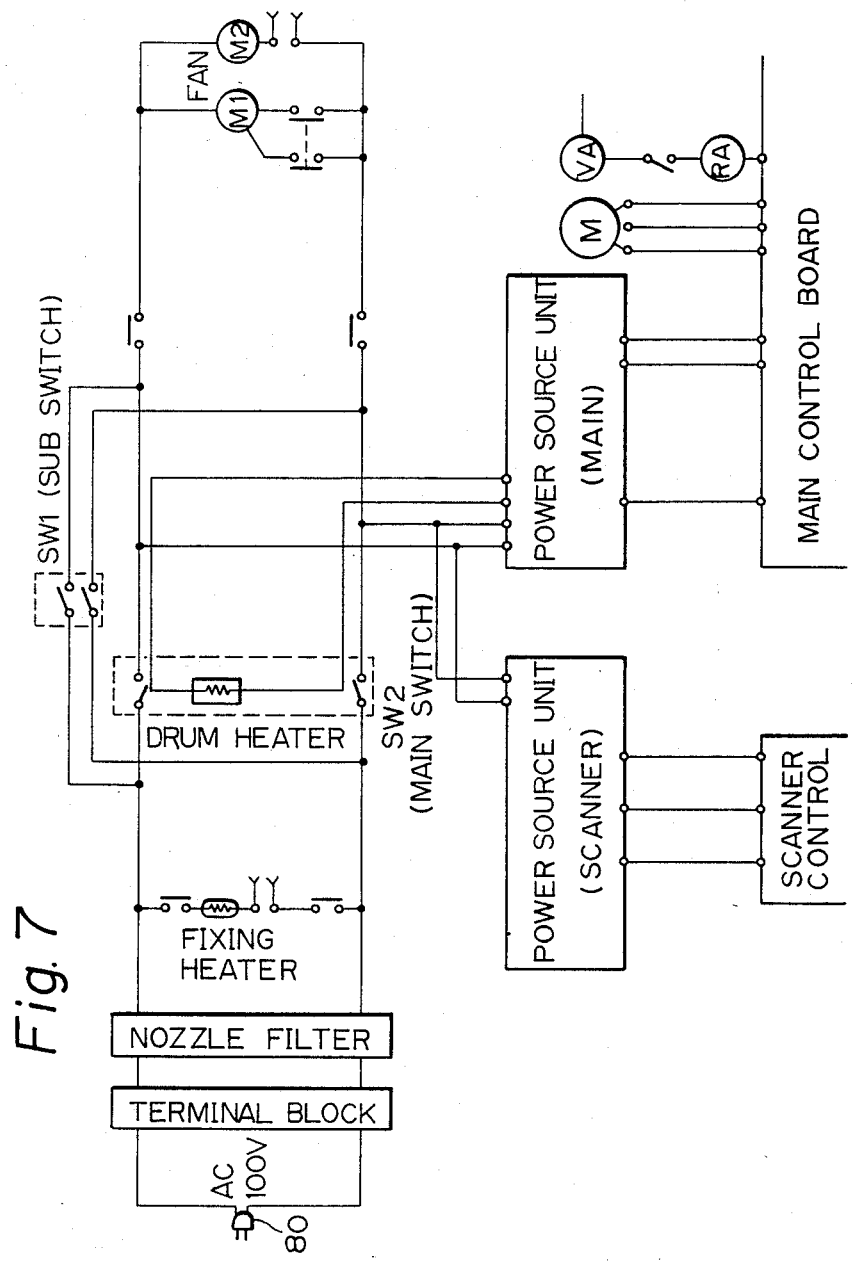
FIG. 7 is a schematic block diagram of a power source section.

Referring to FIG. 7, the power source section includes a main switch SW2 and a subswitch SW1 through which an AC 100 volts from a power source cord 80 is fed to a main power source unit and a scanner power source unit. The main power source unit feeds DC voltage to the main control board, sorter control board, facsimile control board, etc. On the other hand, the scanner power source unit feeds DC power to the scanner control section, ADF control section, operating section, etc.

Figure 8:
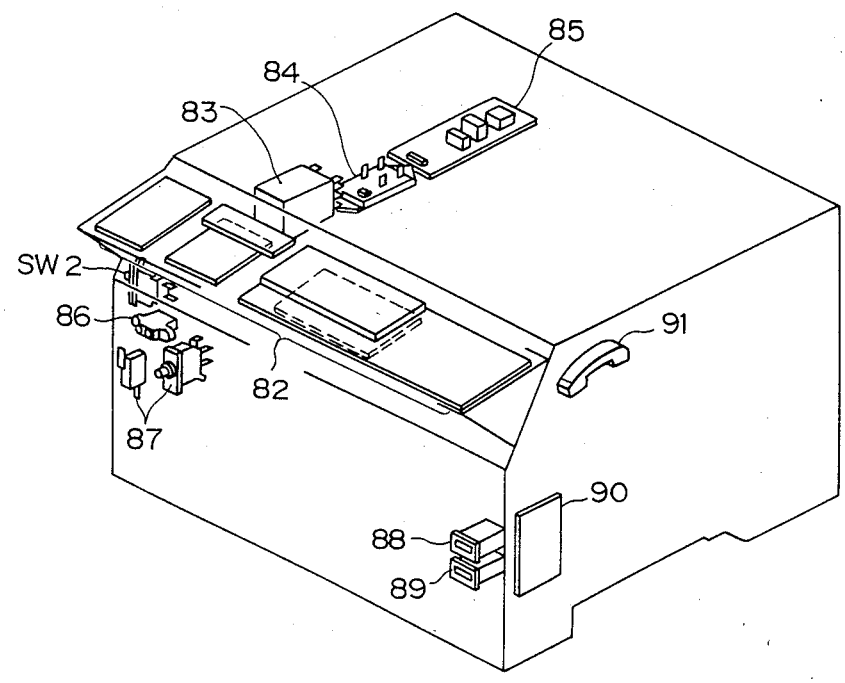
FIG. 8 is a view of various parts as viewed from the front of the combined apparatus.
Figure 9:
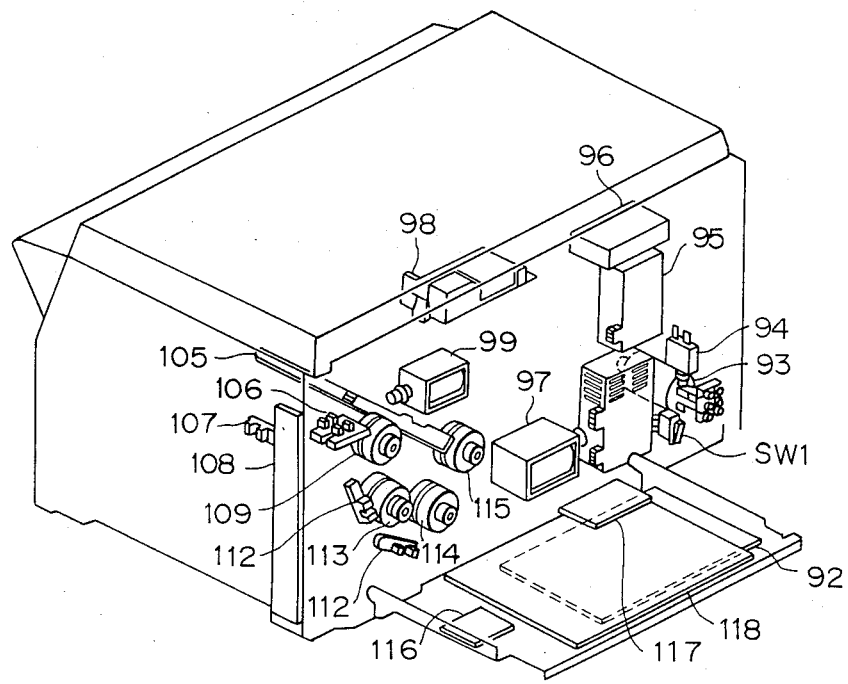
FIG. 9 is a view of various parts as viewed from the rear of the combined apparatus.

FIGS. 8 and 9 show the arrangement of various parts which are respectively viewed from the front and the rear of the combined apparatus. In FIG. 8, there are shown an operating section 82, a power relay 83, a SSR 84 including a heater, transport fan and motor, a relay unit 85, a safety switch 86, a door switch 87, a total counter 88, a facsimile reception counter 89, a communication circuit board 90, a telephone 91, and the main switch SW2. As shown, the main switch SW2 is located in a front part of the apparatus as in a usual copier. Shown in FIG. 9 are a main control board 92, a noise filter 93, a circuit breaker 94, a power pack 95 for cleaning, a bias roller power pack 96, a blade solenoid 97, a charge and bias power pack 98, a toner supply solenoid 99, a register sensor 105, a color sensor 106, a manual insertion sensor 107, a NCU 108, a first paper feed miroclutch 109, a paper end sensor 112, a second paper feed microclutch 113, a third repeat microclutch 114, a register microclutch 115, a paper feed control board 116, a MODEM 117, and the subswitch SW1. As shown in FIG. 9, the switch SW1 is disposed in a position remote from the main switch SW2, i.e., on the back of the apparatus.

Figure 10:
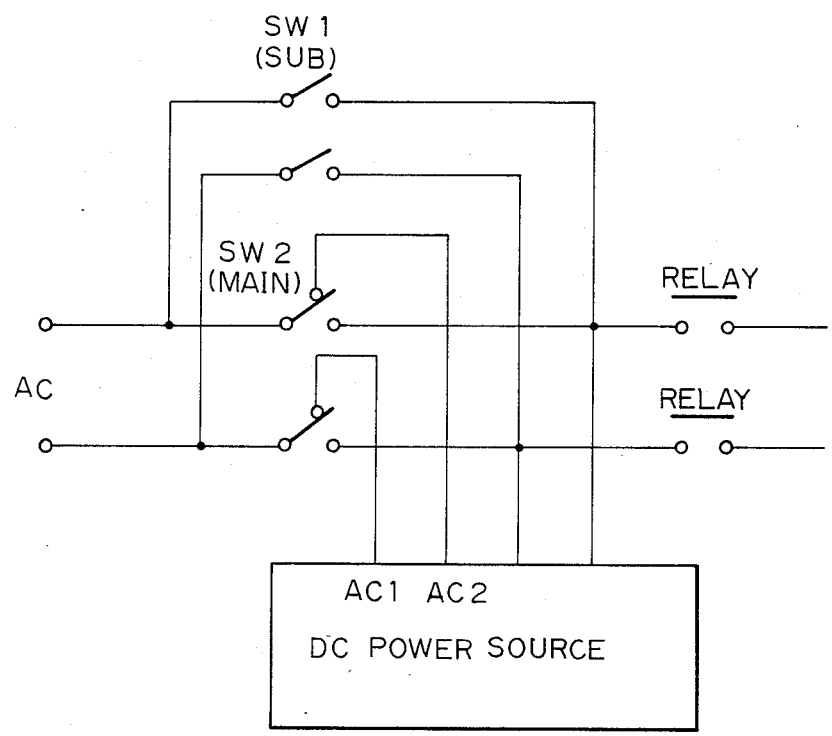
FIG. 10 is a diagram showing a power supply circuit.
Figure 11:
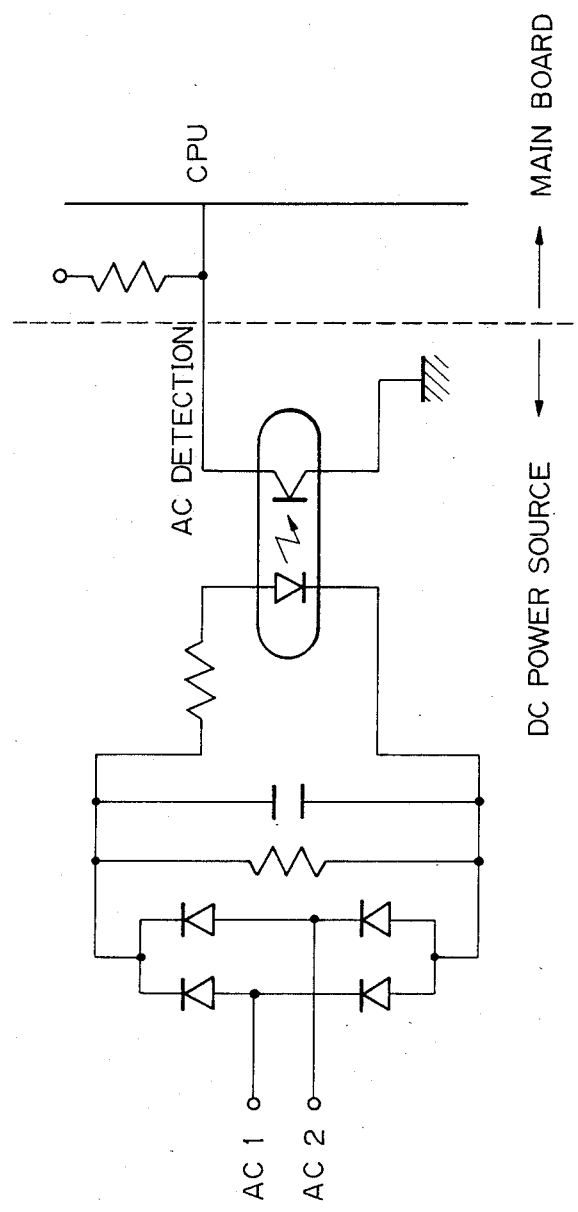
FIG. 11 is a diagram showing a DC power source circuit.

FIGS. 10 and 11 show a power supply circuit and a DC power source circuit, respectively. As shown in FIG. 10, when any of the switches SW1 and SW2 are turned on, the AC power source is fed to the body. AC1 and AC2 are associated with the main switch SW2 in order to detect whether or not the switch SW2 is turned on. In the DC power source circuit, a circuit shown in FIG. 11 is associated with the AC1 and AC2. In this construction, when the main switch SW2 is off, AC is fed to turn on a phtotcoupler resulting the inlet of the CPU having a low level. Conversely, when the main switch SW2 is on, the photocoupler is turned off to turn the input of the CPU into a high level.

How to use the main switch SW2 and subswitch SW1 will be described.

(A) When the apparatus is used as a copier:

In this case, the subswitch SW is turned off so that 100 volts may be fed to allow the apparatus to operate as a copier.

(B) When the apparatus is used as a combined copier and facsimile apparatus:

(a) When the subswitch SW1 is on and the main switch SW2 off: A soft reset signal is fed to each system. Each CPU received the soft reset signal clears a RAM, turns off ports, and performs other various operations to set up the same conditions as power on reset conditions (however, the facsimile CPU is not reset by the soft reset signal). At this instant, a main relay which is connected to the sequence CPU is of course deenergized, deactivating the entire AC system installed in the apparatus. However, the DC power source is fed to each CPU because AC 100 volts is fed to the main and scanner power source units, as shown in FIG. 7. This is representative of a condition in which the apparatus is not used as a copier and therefore the main switch SW2 is turned off to set up a facsimile reception mode only, such as at nighttime. When the subswitch SW1 is turned off in such a condition, the supply of AC 100 volts to the apparatus body is shut off at the time when the main switch SW2 is turned off with the result that all the power source units are turned off to inhibit nighttime facsimile reception. Should the subswitch SW1 be absent, nighttime reception would be impossible unless the main switch SW2 is kept on even at nighttime (in this condition, the power relay and therefore the AC fan, preheater and the like are turned on to wastefully consume power).

In accordance with the present invention, the main switch SW2 and the subswitch SW1 are provided independently of each other; when the copier function is not necessary such as at nighttime, the switch SW1 is turned on and the switch SW2 is turned off. This turns off the scanner, sequence, all the output ports of the operating section and power relay, contributing a great deal to power saving. Further, since the DC power source (5 volts, ±12 volts) is fed to the facsimile control section, the facsimile is held in a reception mode.

b. When both the subswitch SW1 and the main switch SW2 are on: When the main switch SW2 is turned on, a program start signal is delivered to each CPU causing the latter to start operating. When a paper jam or like trouble occurs or a serviceman call occurs while the copier is in use, the main switch SW2 is usually turned off for resetting purpose. This is also performed when the copier and facsimile functions are combined. In this case, if the subswitch SW1 is absent, all the facsimile data are cleared during transmission or reception. In contrast, so long as the subswitch SW1 is turned on, the main switch SW2 does not effect the transmission and reception of facsimile data even if it is turned on.

Figure 12A:
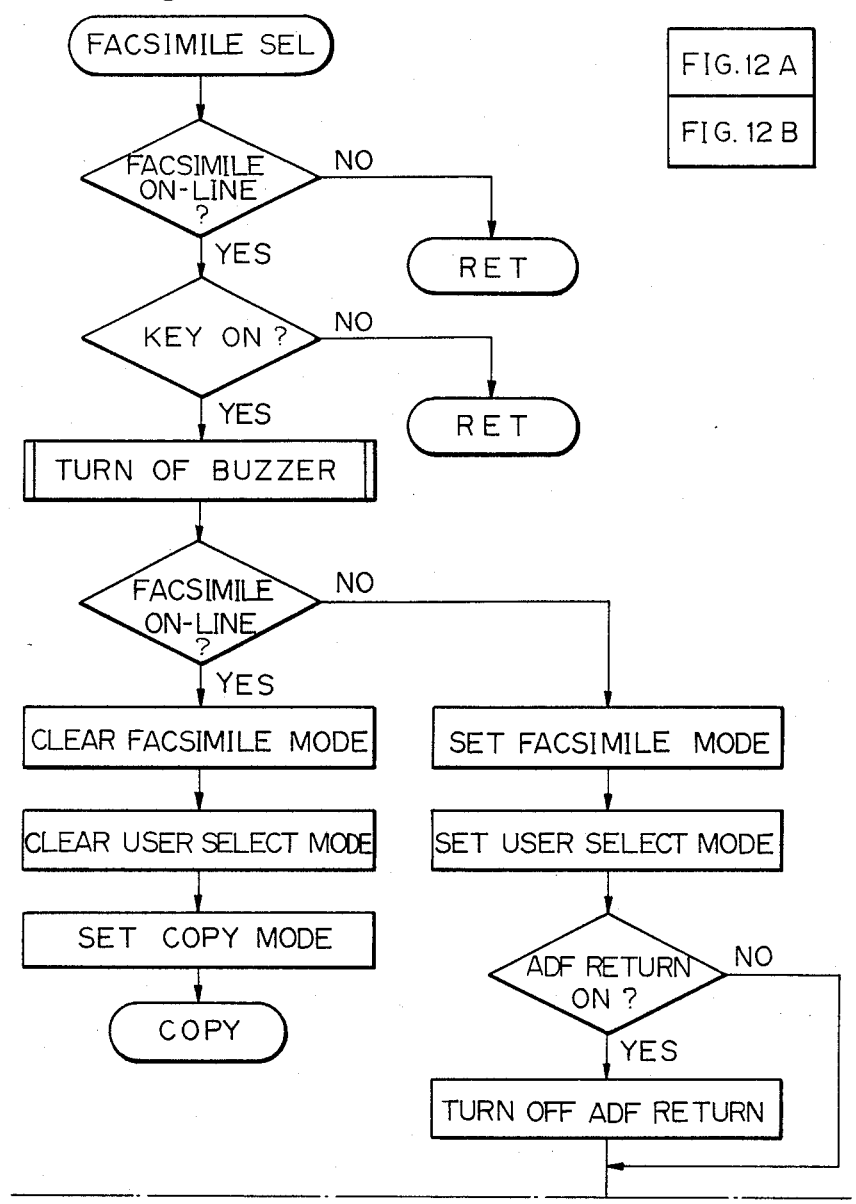
FIG. 12 is a flowchart demonstrating the selection of a facsimile and a copy mode which is effected by a key.
Figure 12B:
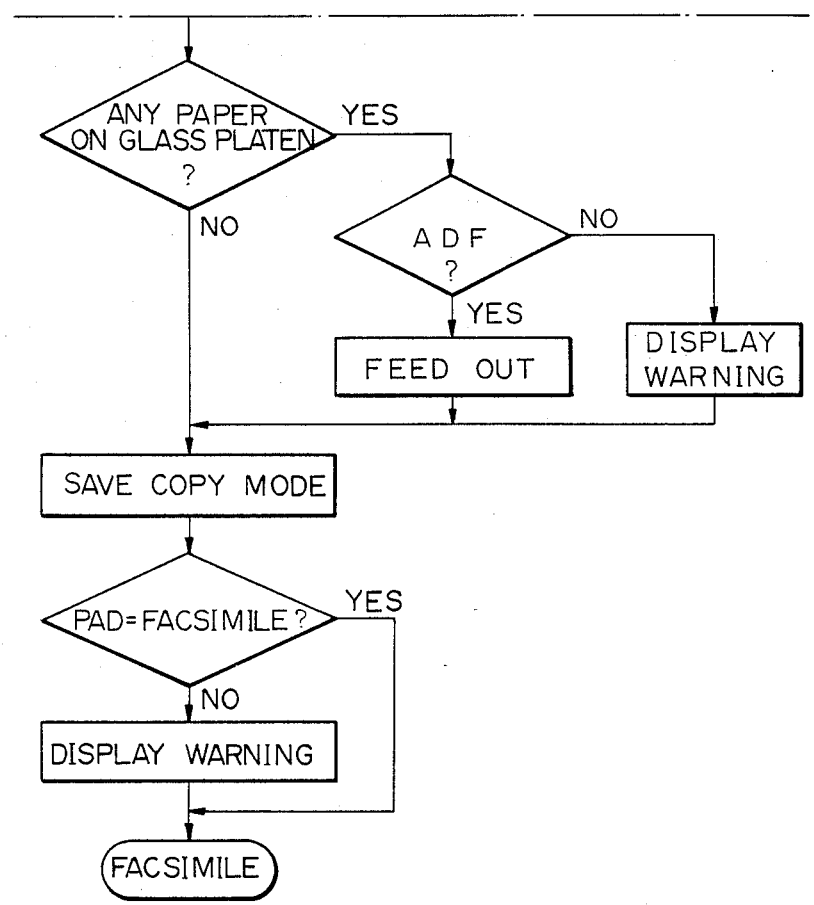

Referring to FIG. 12, how the facsimile mode and the copy mode are selectively set up by a key is shown in a flowchart. When a single key adapted to select any of those modes is depressed, a buzzer is energized. If the facsimile mode has already been set up, it is cancelled and a user select flag is cleared to restore a copy condition which is to preceed the facsimile mode.

If the copy mode has already been selected when the key is depressed, the facsimile mode and the user select mode are sequentially turned on. If an ADF return is displayed, the ADF return is turned on. If the ADF is in use with the glass platen loaded with a document, the document is fed out. Then, the copy mode of that time is saved and then the facsimile mode is set up. A copy/facsimile display panel selection pad, which will be described, is checked and, if it is a copy pad, a message such as "USE FACSIMILE PANEL" is displayed.

Figure 13B:
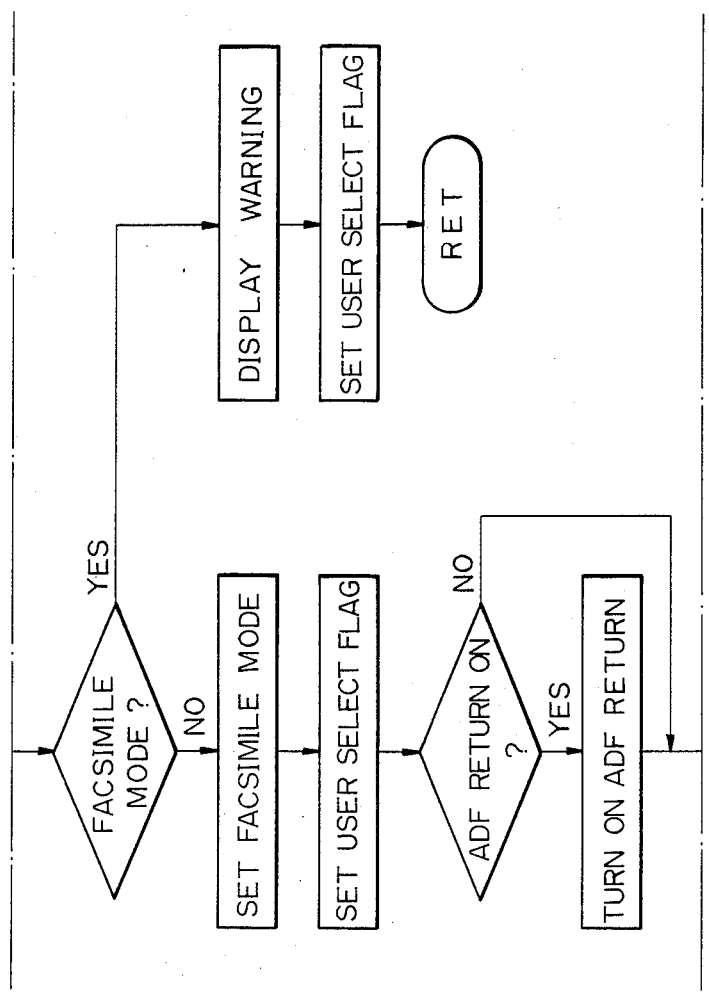
FIG. 13 is a flowchart demonstrating the section of a facsimile and a copy mode which is effected by a pad.
Figure 13C:
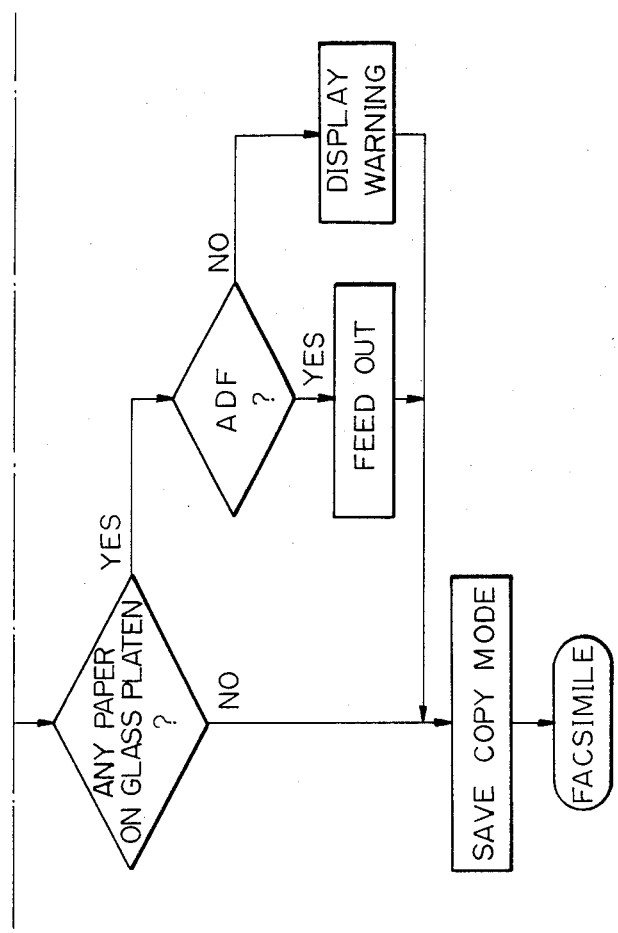

Referring to FIG. 13, the copy/facsimile mode selection which relies on a pad is shown in a flowchart. When a pad assigned to a facsimile mode is replaced with a pad which is assigned to a copy mode and if the copy mode has already been set up, the program returns. If the facsimile mode has been set up, the facsimile mode is turned off, the user select flag is cleared, and the copy mode is set to restore the copying state. When the copy mode pad is replaced with the facsimile mode pad and if the current mode is the facsimile mode, the warning in the form of a message is cleared and the user select flag is set. If the current mode is the copy mode, the facsimile mode is turned on, the user select flag is set, ADF processing is performed, and the facsimile mode is set up with the copy mode saved.

Figure 14A:
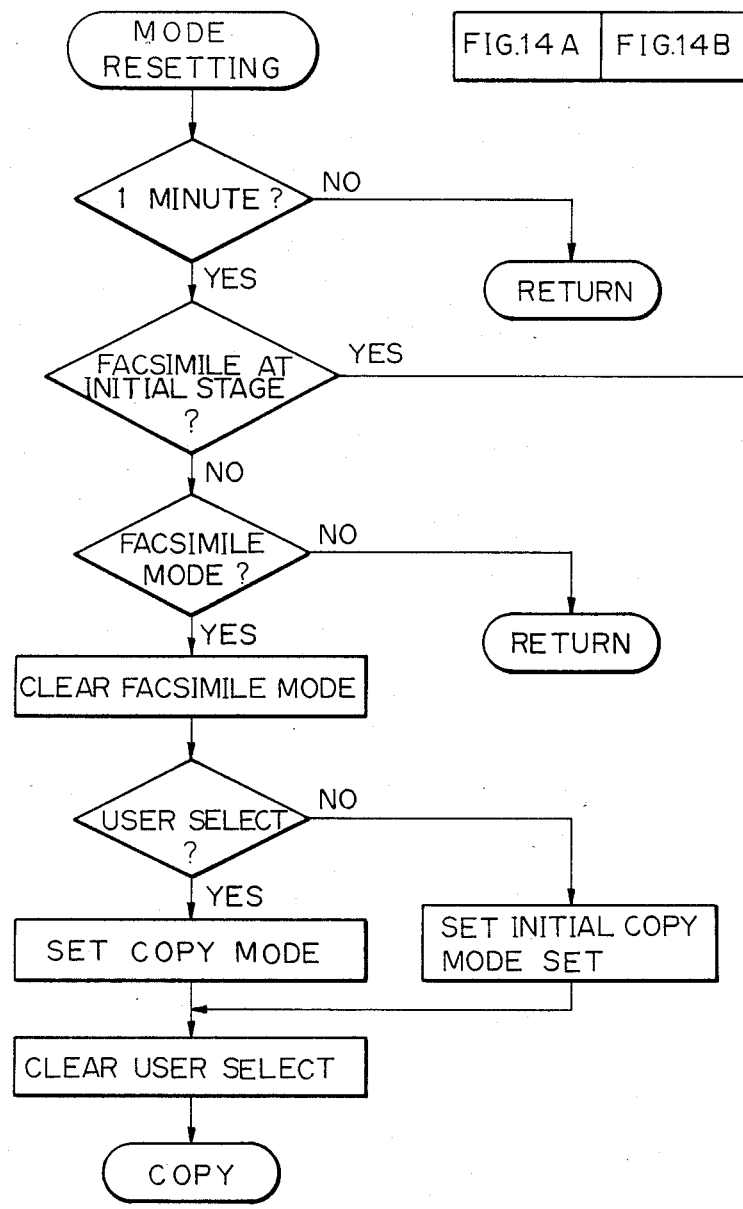
FIG. 14 is a flowchart showing copy and facsimile mode resetting.
Figure 14B:
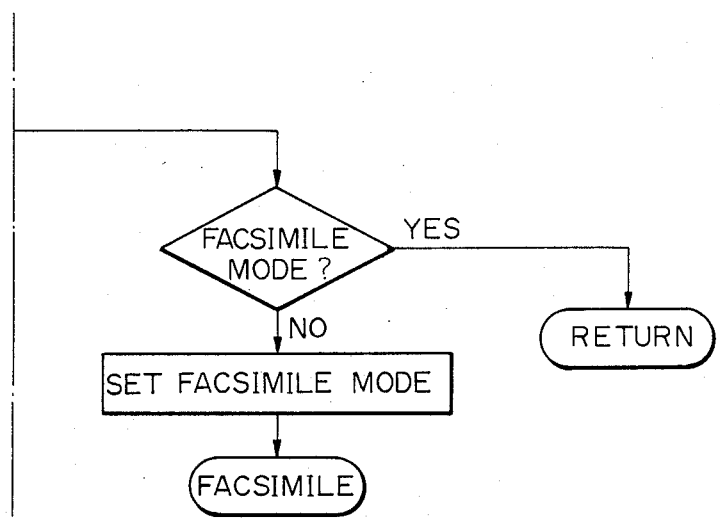

FIG. 14 is a flowchart demonstrating a procedure for resetting the copy and facsimile modes. As for the default of the copier or the facsimile, it may be implemented with a dip switch or the like. Under an autoreset condition, the mode is determined by the dip switch. While the apparatus is not manipulated for more than a predetermined period of time such as 1 minute, the auto-reset condition is set up. If the mode in the initial condition is the copy mode, the copy mode is set up while, if it is the facsimile mode, the facsimile mode is set up. When the facsimile mode is selected by user selection, the copy mode is set; if it is not the user selection, the copy mode is returned to the initial state.

The switch type changeover or the pad type changeover described above can be effected even if a key counter such as a key card is absent. This is because a key counter strictly belongs to the copier and has nothing to do with the transmission of facsimile data.

Figure 15:
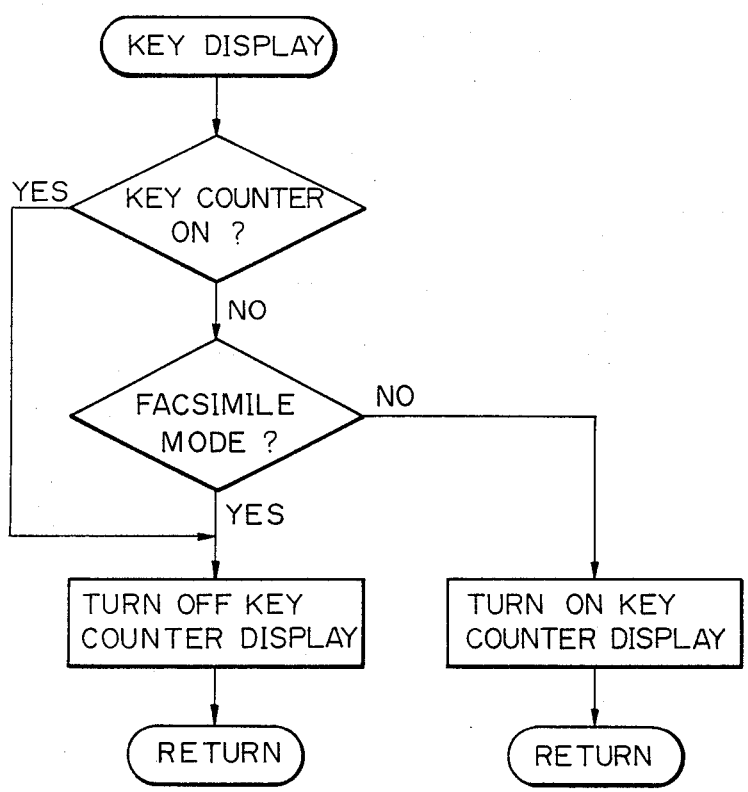
FIG. 15 is a flowchart representative of key counter display.

FIG. 15 is a flowchart associated with the key counter display. When the key counter is on or when the facsimile mode is selected while the key counter is off, the key counter display is turned off.

Figure 16:
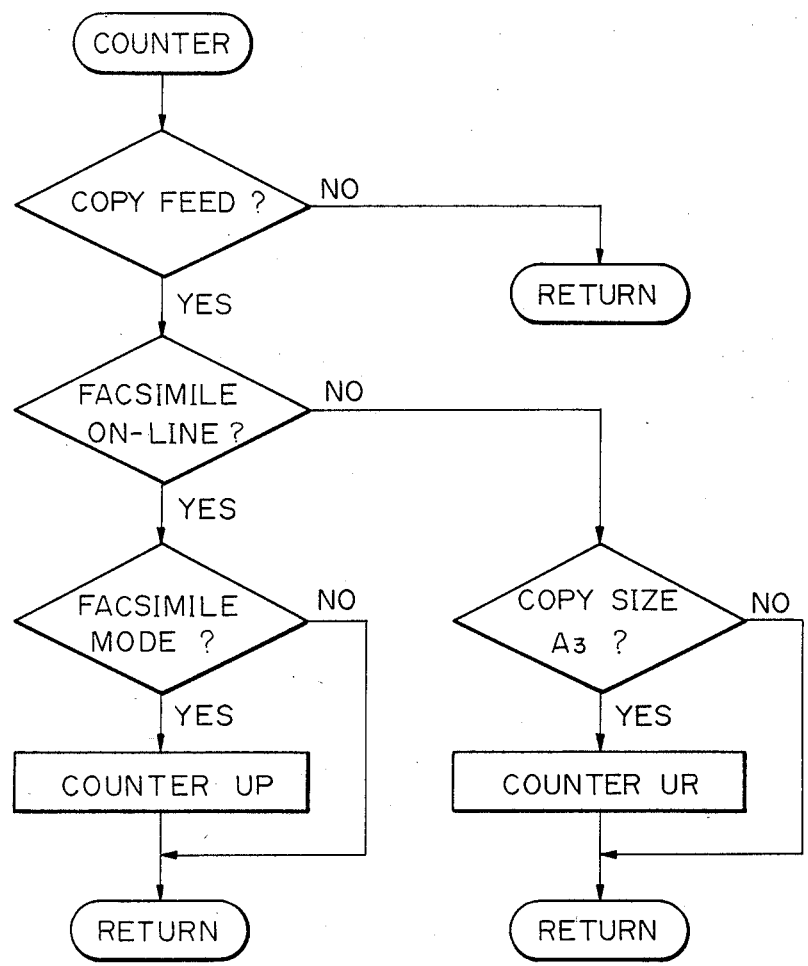
FIG. 16 is a flowchart demonstrating counter control.

Referring to FIG. 16, a flowchart demonstrating counter control is shown. The copier is provided with a counter for counting particular papers in addition to the total counter. When a copy feed signal arrives while the facsimile is on-line, the counter is incremented if the facsimile mode is selected and it is not incremented if the copy mode is selected. While the facsimile is not on-line, the counter is used to count copies (in this case, A3 counter), i.e., it is incremented every time a paper of format A3 is fed. Alternatively, this kind of counter is operable as a jam counter or the like. Such a construction allow the total counter to show the total number of papers fed and the facsimile counter to show the number of papers handled by the facsimile section, promoting convenient use of the apparatus. Alternatively, the counter may count copies while the facsimile section is connected.

Figure 17:
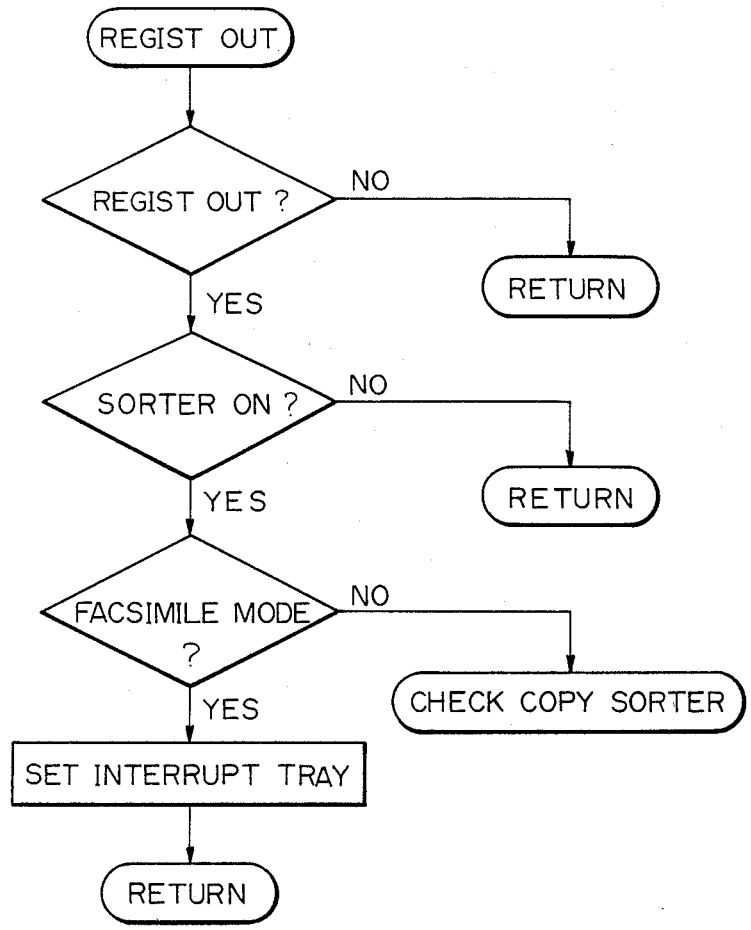
FIG. 17 is a flowchart demonstrating sorter control.

FIG. 17 shows a flowchart demonstrating sorter control. The sorter associated with the copier includes a first tray to which papers are usually discharged and a second tray, or interrupt tray, to which papers are directed in the event of mode failure or interruption. In the facsimile mode, papers printed with data are fed out to the interrupt tray instead of the usual tray which is usually used with the copier. This prevents a person who intends to use the copier from taking away those papers which were received by the facsimile. When the sorter is not used, there may be used a discharge tray having two exclusive bins which are individually assigned to the copier and the facsimile. Such a two-bin tray allows papers produced from the facsimile and papers produced from the copier to be separated from each other.

Figure 18:
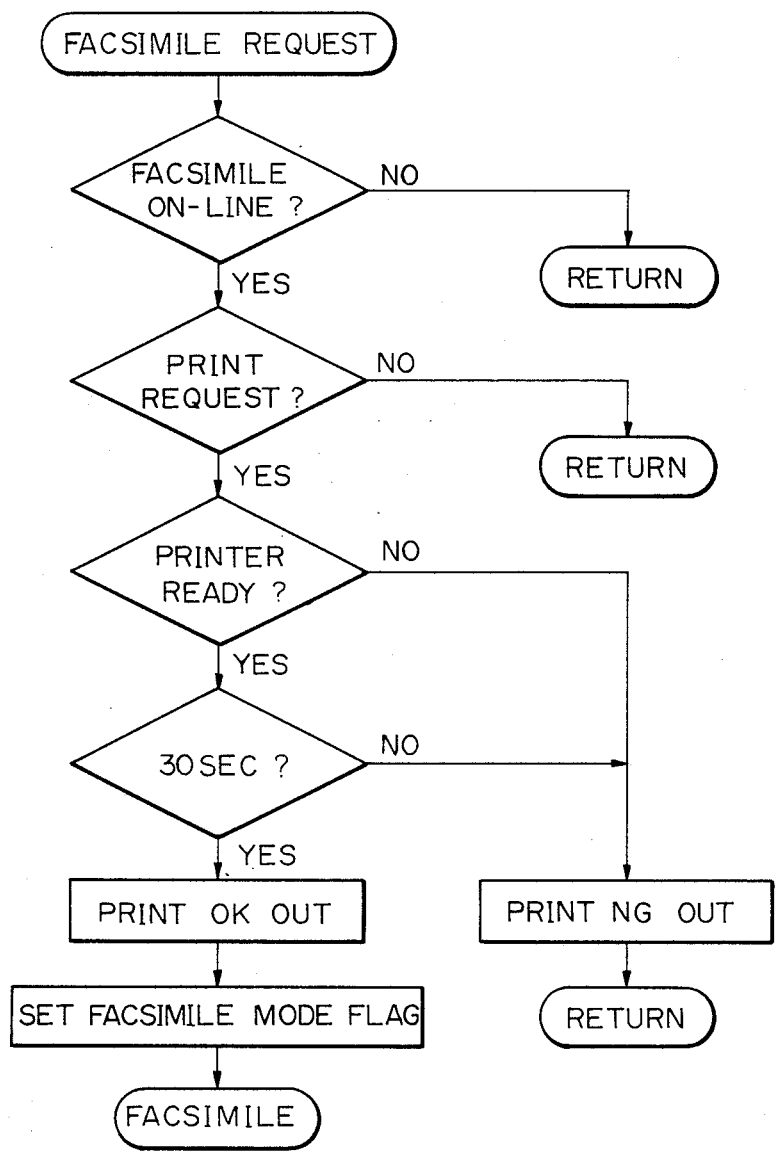
FIG. 18 is a flowchart showing the control over facsimile data reception which may occur during the copy mode.

FIG. 18 is a flowchart showing the control over facsimile reception which may occur during the copy mode. When the reception of facsimile data is completed while the copy mode is set up, the facsimile section delivers a print request signal. If the printer is ready and, in addition, it has not been operated for more than a predetermined period of time such as 30 seconds, a print OK signal is fed out to automatically replace the copy mode with the facsimile mode. When the printer is not ready or, even if it is ready, when the predetermined period time has not expired, a print NG signal is fed out. That is, when the printer is not ready due to a door open condition, paper jam, serviceman call or the like and the copying operation may be resumed, the transition to the facsimile mode is inhibited. In this manner, facsimile data are printed out only when the apparatus is idle so that the down time of the copier itself is considerably reduced. When the operator manipulates the apparatus while facsimile data are printed out, the user select flag is set.

Figure 19:
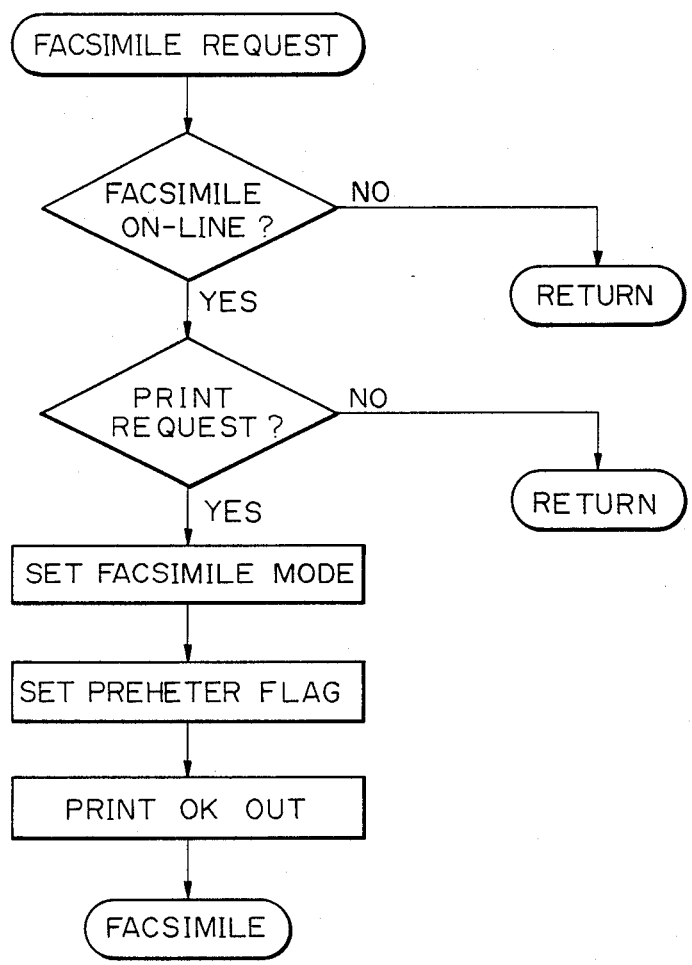
FIG. 19 is a flowchart showing the control over facsimile data during a preheat mode.

FIG. 19 is a flowchart representative of control over facsimile reception which may occur while a preheat mode is set. When the reception of facsimile data is ended during the preheat mode operation, the facsimile sends a print request signal. At this instant, when the printer is ready and not used as a copier, the apparatus is immediately switched from the copier mode to the facsimile mode. At this time, a preheat flag is set. When a person manipulates the apparatus while the printer output is under way, the preheat flag is set.

Figure 20:
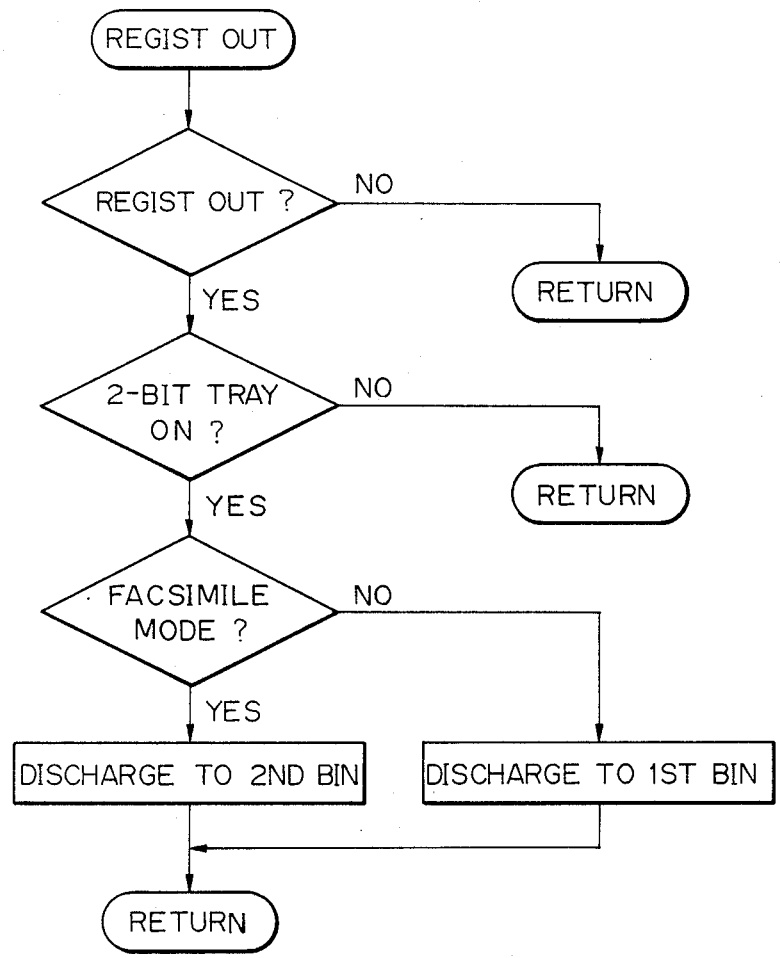
FIG. 20 is a flowchart representative of a procedure which follows the end of print-out of facsimile data.

FIG. 20 is a flowchart representative of a procedure which follows the end of facsimile data print-out. As all the data received by the facsimile are outputted, an end-of facsimile signal is produced upon the discharge of the last paper. At this instant, if the user select mode is set up (the facsimile mode is selected by the user's intention), the facsimile mode is continued and is not replaced with the copy mode until the facsimile/copy switch or the pad is manipulated. When the user select mode is off, the facsimile mode is turned off. If the preheat flag is on, the program restores the preheat mode and, if it is off, the program returns to the copy mode.

When the facsimile produces a print request, the transition to the facsimile may occur to print out data even if the key counter is absent. This is because the key counter is strictly a copy counter and has nothing to do with the print-out of facsimile data. Even though the key counter supervises the number of copies produced, there is no chance of mistake due to the presence of total counter and facsimile counter. Upon the transition to the facsimile mode, the key counter display is turned off.

All the systems described above are interconnected by the serial interface. Signals are fed to the individual systems in the order of an initial set signal and a program start signal. When any of the systems (sequence, operating section, scanner and facsimile) receives the program start signal, the usual operation is performed. Upon reception of the initial set signal only, each system waits in the initial state (RAM being cleared, input port being turned off, etc.)

Figure 21A:
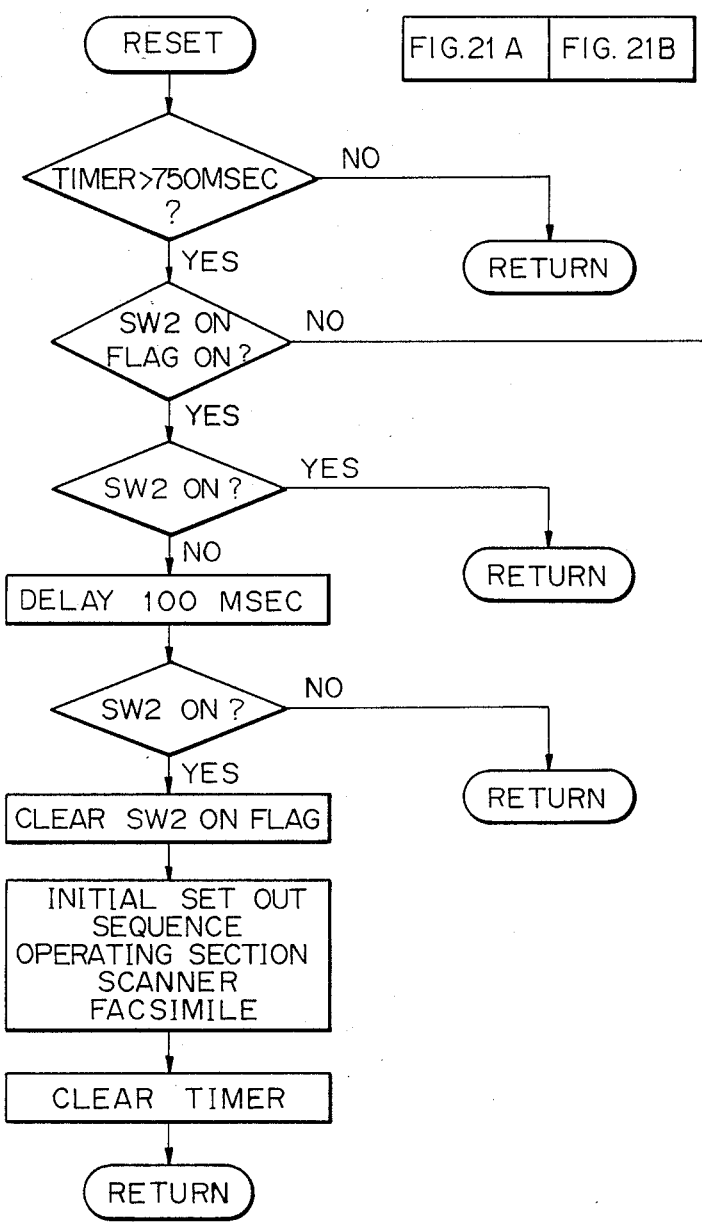
FIG. 21 is a flowchart representative of a power surce control system.
Figure 21B:
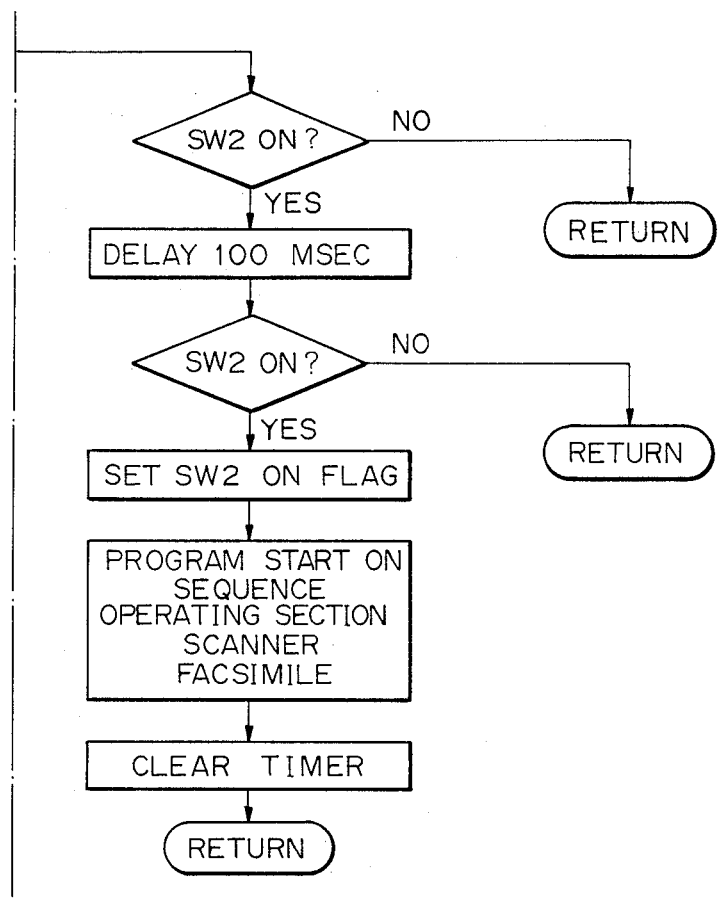

FIG. 21 is representative of a power source control system which is included in the main routine. The procedure begins with seeing if a timer has counted a predetermined period of time, in order to guarantee the time for each system to complete initial setting. Subsequently, whether or not the main switch SW2 flag is set is determined, i.e., AC detection is checked. If the main switch SW2 is on, the program returns and, if it is off, whether or not the main switch is on is checked again upon the lapse of 100 milliseconds (this interval is to avoid malfunctions ascribable to noise). At this time, if the switch SW2 is on, the program returns and, if it is off, the flag is cleared and an initial set signal is sent to each system.

In response, each system clears the RAM and turns off all the ports to set up a false power-off state. At this instant, the sequence is of course initialized to deenergize the relay, so that AC is prevented from being fed into the apparatus. This condition is maintained until the main switch SW2 becomes on.

If the main switch SW2 flag is off, whether the switch SW2 is on is determined. If it is off, the program returns and, it it is on, whether the switch SW2 is on is checked again upon the lapse of 100 milliseconds. If it is off, the operation returns while, if it is on, the flag is set to deliver a program start signal to each system. Then, each system begins to operate.

So long as the apparatus is used as a mere copier, the subswitch SW1 is maintained turned off and the main switch SW2 is turned on and off. When the apparatus is operated as the combined copier and facsimile apparatus, the subswitch SW1 is maintained turned on and the main switch SW2 is used as a false main switch. In practice, the main switch SW2 is continuously turned on, for example, from 8.00 am to 8.00 pm during which a copier is usually used. During the other hours, the main switch SW2 is turned off. On the other hand, the facsimile is ready to receive data throughout the day. It follows that so long as the subswitch SW1 is turned on, the DC power source is continuously fed. Since this DC power source is fed to the facsimile, the facsimile is operable to receive data even when the main switch SW2 is turned off. Under this condition, when the reception of facsimile data is completed and then a print request signal arrives, a program start signal is produced to activate the system to print out the data. Alternatively, the printer alone may be activated. After the print-out, an initial set signal is produced again to deactivate the system. When an initial set signal is applied to the facsimile, the facsimile simply detects the power-off condition and does not effect RAM-clear, port-off and like operations.

Figure 22:
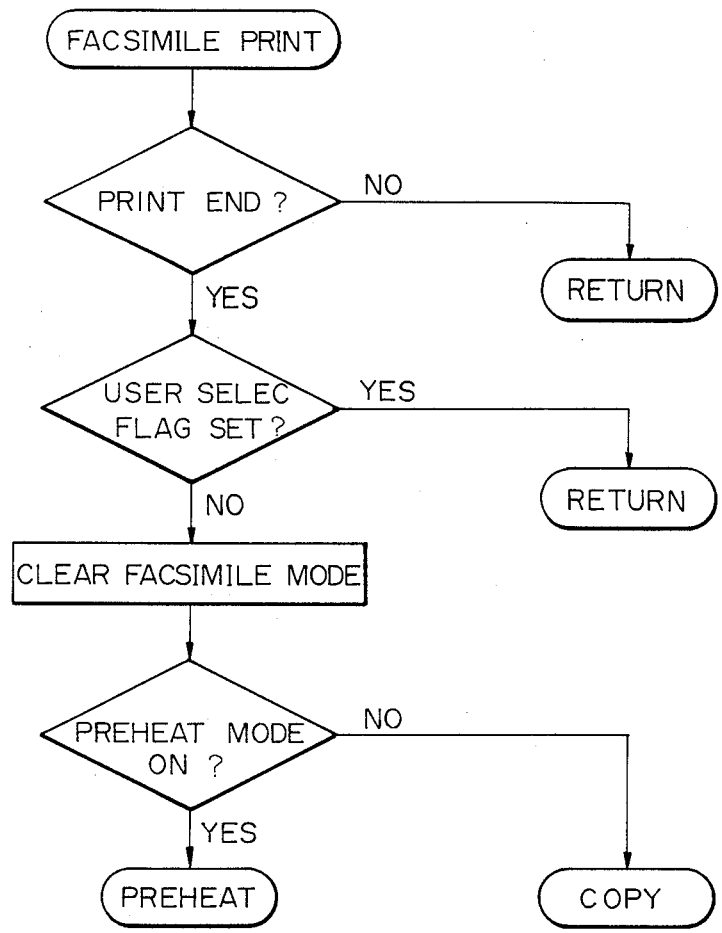
FIG. 22 is a flowchart demonstrating facsimile data print-out.

FIG. 22 is a flowchart showing a facsimile print-out procedure.

Figure 23:
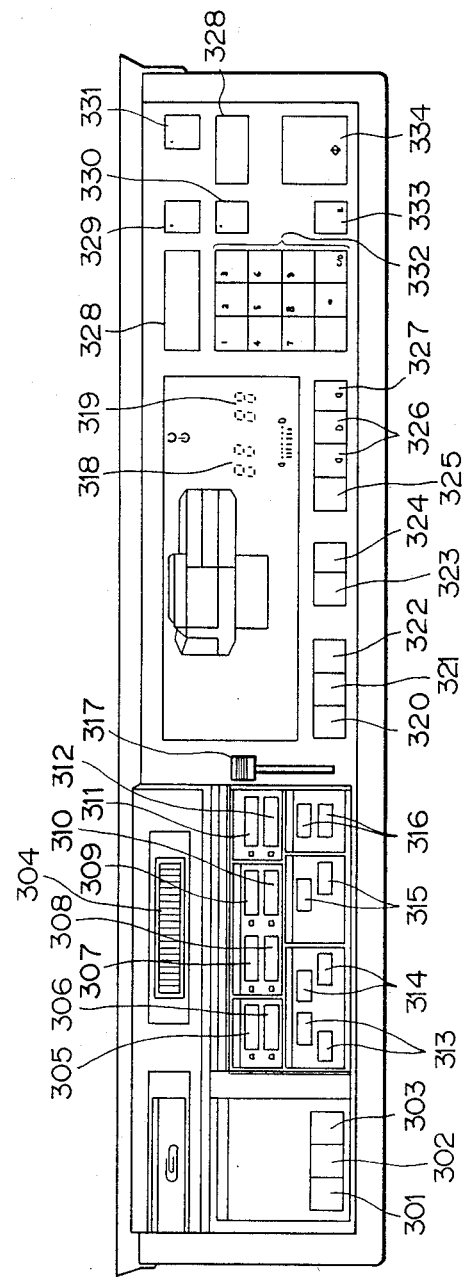
FIG. 23 is a plan view of an operation panel in a condition wherein only the copier function is selected.
Figure 24:
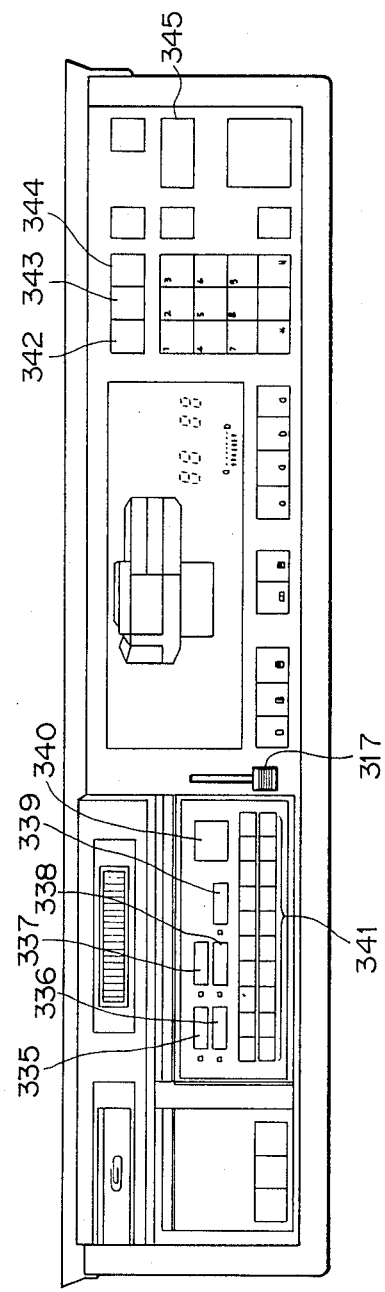
FIG. 24 is a plan view of the operation panel in a condition wherein the copier and facsimile functions are combined.

FIG. 23 is a plan view of the apparatus which is used as a copier, i.e., the facsimile function is not adopted. FIG. 24 is a plan view of the operation panel of the apparatus which is used when the apparatus is operated with the facsimile function. In FIG. 23, there are shown a sorter key 301 which may be depressed to use the sorter, a two-side key 302 for setting up the two-side copy mode, a page continuation 303 key for automatically copying a spread document one side at a time or automatically copying a two-sided document one side at a time, a liquid crystal display 304 for showing a person how to manipulate the panel as well as the operating conditions of the apparatus, a full-surface blank key 305 operable to blank the entire surface of a copy, a full-surface invert key 306 for replacing black and white with each other on the entire surface of a copy, an outside erase key 307 for erasing the outside of a particular area which may be specified by a line marker, an inside erase key 308 for erasing a particular area which may be specified by the line marker, a blank key 309 for blanking an area which may be specified by the line marker, and an invert key 310 for replacing black and white with each other in a particular area which may be specified by the line marker.

Also shown in FIG. 23 are a double copy key 311 for reproducing two different documents of an A5 size, a B6 or like relatively small size simultaneously on a single paper which is double the size of the documents, a magnification change key 312 for copying a document by a magnification which matchs with a specified paper size and a document size, a magnification change key 313 for specifying the longitudinal and lateral dimensions of a document, a magnification change key 315 for specifying the vertical and lateral dimensions of a copy, and a zoom magnification change key 316 for specifying a copy magnification on a 1% basis.

A copy/facsimile selector lever 317 which allows the previously stated marker area editing, independent magnification change, and other various kinds of editing to be effected when it is manipulated to the copy side and allows various facsimile functions which will be described to be effected when it is manipulated to the facsimile side.

Further shown in FIG. 23 are a set copy number display 318, a copy number display 319, a reduce key 320, an enlarge key 321, a xl magnification key 322, a paper select key 323, an automatic paper select key 324, a document kind key 325, a density adjust key 326, an automatic density key 327, removable top covers (seals) 328 which will be mounted when the apparatus is used as a copier only, an interrupt key 329, a program key 330 for reading or writing a program, a preheat mode clear key 331, numeral keys 332 for entering data in the independent magnification change mode and independent dimension magnification change mode and answering questions which may appear on the display 304, and a start key 334.

As shown in FIG. 24, when the copy/facsimile selector lever 317 is moved to the facsimile side, the operation panel is partly and automatically changed, as shown in FIG. 24. Shown in FIG. 24 are a multimode key accessible for registering destinations which may be entered for one-touch dialing and like purposes, a telephone mode key 336, a miniature facsimile 1 key to be operated when the destination is a miniature facsimile terminal 1, a usual character key 338 to be operated when characters printed out on a document are sized the same or greater than ordinary characters, a small character key 340 to be depressed when those characters are relatively small, a transmission start key for starting transmission, and a one-touch dial key for registering telephone numbers or transmitting data by one touch.

When the apparatus used as a combined apparatus, the top covers 328 shown in FIG. 23 are removed so that an abbreviate key 342, a pose key 343, a NO. key 344 and a copy/facsimile selector switch 345 which are essential for a combined apparatus may be accessible.

Figure 25:
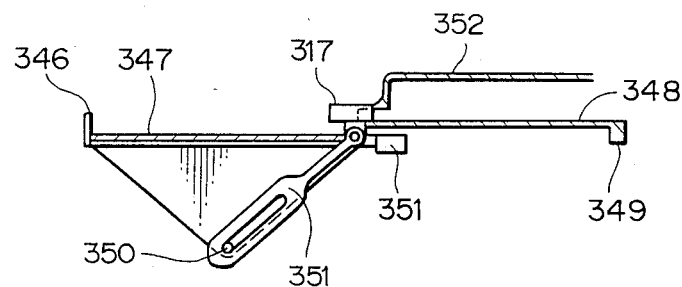
FIG. 25 is a section showing a particular position of a display panel switching mechanism in which a selector lever is located on a copy side.
Figure 26:
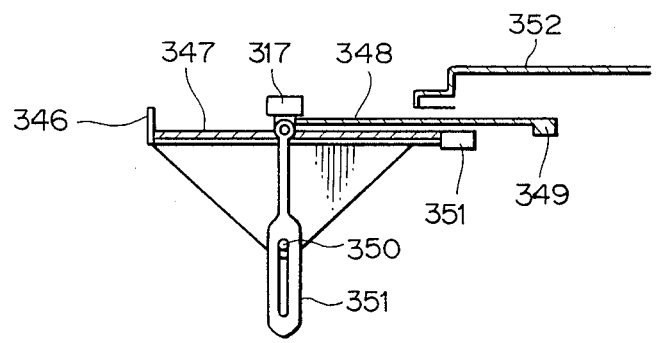
FIG. 26 is a section similar to FIG. 25, showing the selector lever being shifted.
Figure 27:
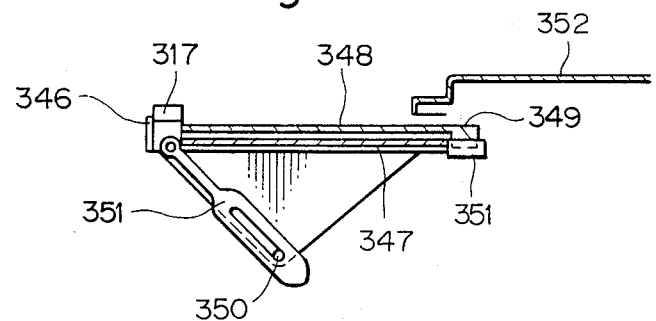
FIG. 27 is a view also similar to FIG. 25, showing the selector lever located on a facsimile side.

Referring to FIGS. 25 to 27, there is shown a mechanism (pad) for changing the display when the copy/facsimile selector lever 317 is operated. As shown, a copy display panel 347 is fixed in the inner bottom portion of a square frame 34. Disposed slidably above the copy display panel 347 is a facsimile display panel 348. Arranged on the copy display panel 347 are the full-surface editing keys 305 and 306, marker area editing keys 307 to 310, double copy key 311, paper specified magnification change key 312, independent dimension magnification change keys 313 and 314, independent magnification change key 315, and zoom magnification change key 316 which are indispensable for a copier, as shown in FIG. 23. Arranged on the facsimile display panel 348 are the multimode key 335, telephone mode key 336, mini-facsimile 1 key 337, usual character key 338, small character key 339, transmit key 340, and one-touch dial key 341 which are indispensable for a facsimile terminal, as shown in FIG. 24.

A feeler 349 is provided at and integrally with the rear end of the facsimile display panel 348. The selector lever 317 is connected to the front end of the panel 348 in such a manner as not to interfere with the copy display panel 347. The selector lever 317 is connected to the upper end of a lever 351 which is rotatably supported by a shaft 350. A transmission type photosensor 351 is located to to face the feeler 349. The reference numeral 352 designates a panel cover.

In the position shown in FIG. 25, the apparatus is used as a copier. Specifically, the selector lever 317 is tilted to the copy side so that the copy display panel 347 is exposed within the frame 346. In this condition, the various keys on the panel 347 are accessible, and the facsimile display panel 348 remains hided below the cover 352. As the selector lever 317 is moved to the facsimile side (to the left as viewed in the figure), the facsimile display panel 348 is pulled out from below the cover 352. FIG. 26 shows a condition in which the panel 348 is being pulled out so. FIG. 27 shows a condition in which the panel 348 is fully positioned in the frame 346. In the condition of FIG. 27, the feeler 349 is inserted into the photosensor 351 with the result that the photosensor 351 produces a set signal.

Figure 28:
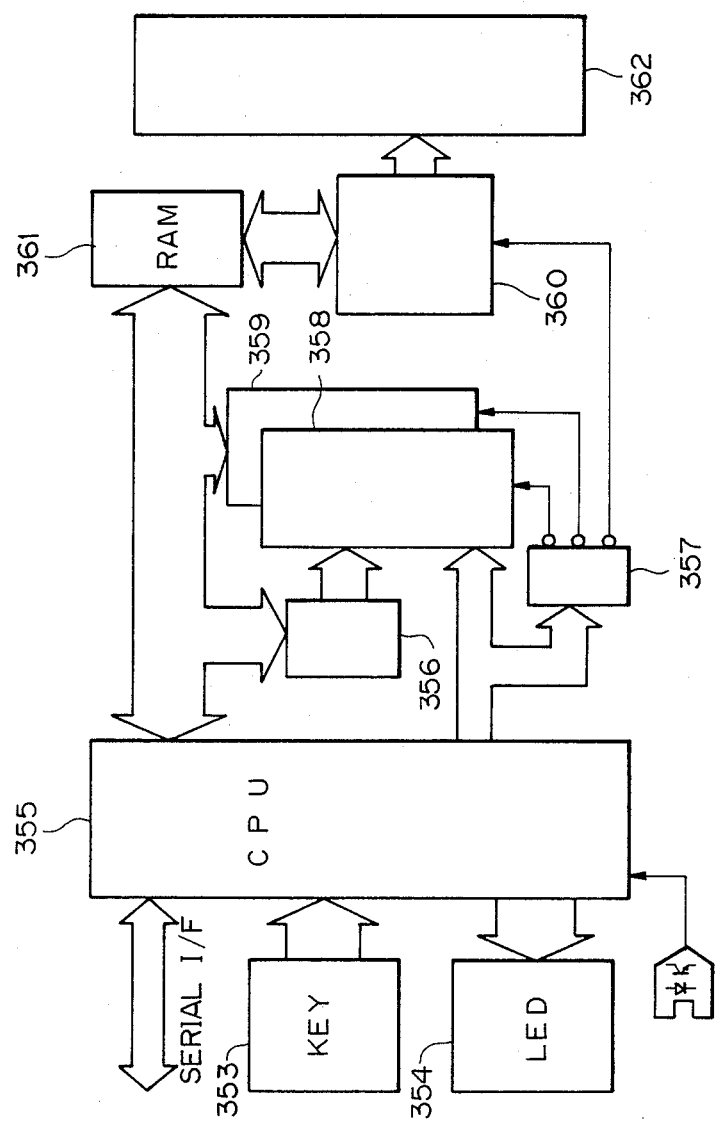
FIG. 28 is a schematic block diagram showing a display panel section control.

Referring to FIG. 28, a control circuit associated with the display panel section is shown. As shown, the control circuit is made up of the photosensor 351, an operating section key matrix 353, an operating section LED matrix 354, a display section microprocessor 355, a latch 356, a decoder 357, a ROM 358 for storing a control program and fixed display data, a RAM 359 for storing desired display data, a LCD controller 360, a RAM 361 for storing screen display data, and a LCD unit 362.

Treated as a single unit, the operating section is connected to the copier controller by an interface so as to interchange data. The display section microprocessor 355 controls the conditions of the input keys as well as the LED and LCD display while communicating with the copier controller. The LCD is constituted by full dots and controlled by the exclusive LCD controller 360 to display data which are stored in the RAM 361. Fixed character data are stored in the ROM358 to serve as LC display data and are written in the RAM 361 in response to ASCII code that is fed from the copier controller. Each system is constructed such that any necessary display data are stored in the RAM 359 and then displayed. The operating section key matrix 353 includes the inputs from the keys of the operating section, the input from the dip switch, and the input from a digitizer which is connected to the switch lever 317 of FIG. 25.

Figure 30:
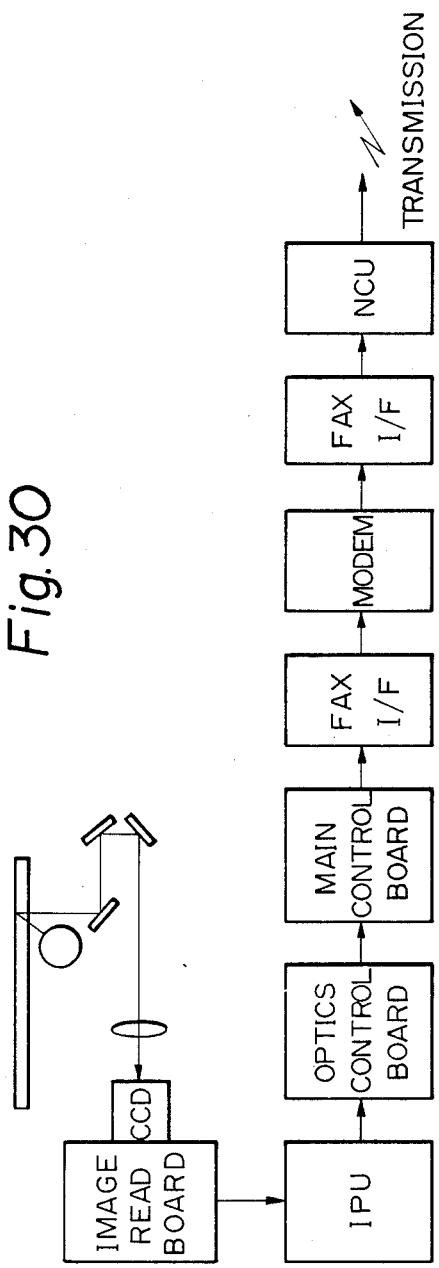
FIG. 30 is a flowchart demonstrating the flow of an image data to be transmitted.
Figure 31:
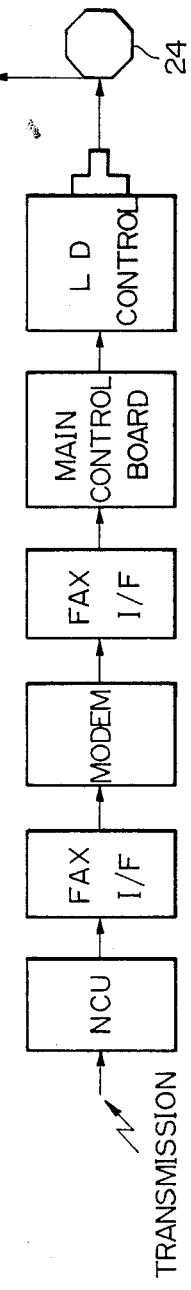
FIG. 31 is a flowchart showing the flow of an image signal received.

FIG. 30 is a flowchart demonstrating the flow of a video signal to be transmitted while FIG. 31 is a flowchart demonstrating the flow of a received video signal. Also shown in FIGS. 30 and 31 are the light source 3, polygon mirror 24, and photoconductive drum 40.

Figure 32:
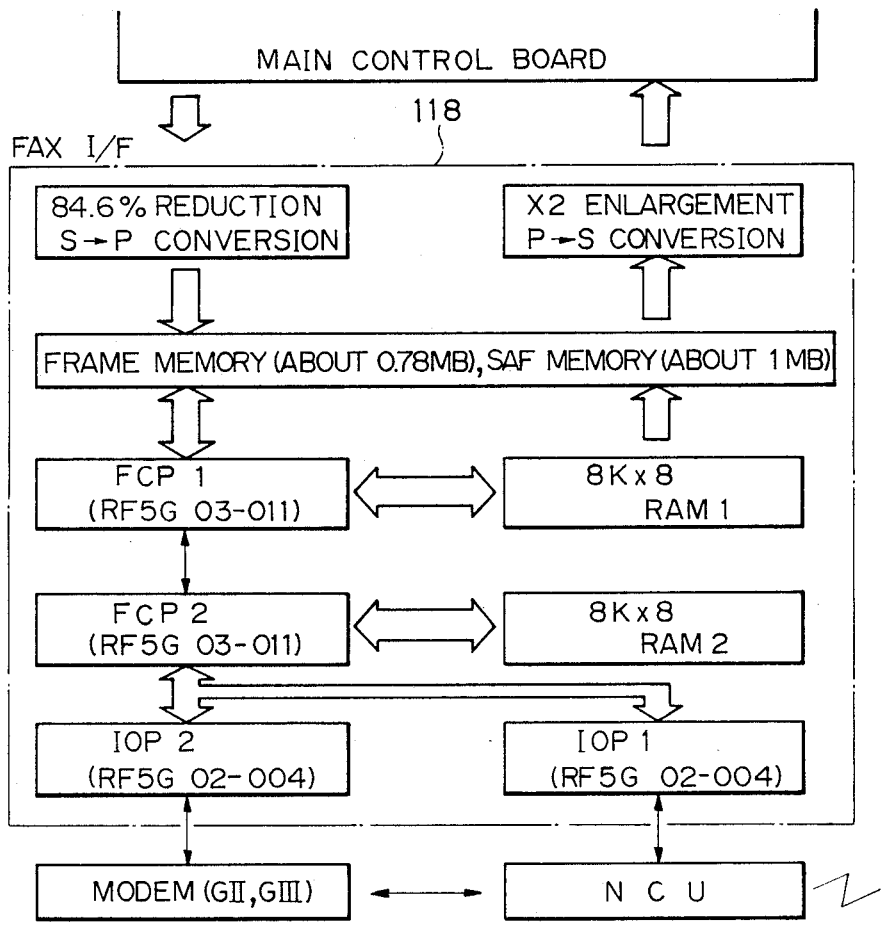
FIG. 32 is a schematic block diagram showing the flow of signals within the facsimile interface board.

Referring to FIG. 32, the flow of signals within the facsimile interface board is shown in a block diagram. The facsimile interface board performs various kinds of control and processing an enumerated below. The CPU is implemented by two 8085As and includes a 0.78 megabit frame memory for image processing and a 1 megabit SAF memory.

(1) System sequence control over facsimile function
(2) Protocol sequence control
(3) Image data processing
 (a) conversion of video signal from scanner section into image signal (converting 2-bit serial signal into 8-bit parallel signal)
 (b) data compression and recovery (MH, MR, EFC)
 (c) reduction (reducing B4 size to A4 size)
 (d) writing and reading data out of SAF memory and compressing and recovering data in the event of input and output (MH, original data)
(4) multimode, selection of function by internal switches, and selection of code
(5) Control over NCU Next, the flow of signals during transmission and reception will be described with reference to FIG. 32.

(1) Transmission of data from scanner section to line:
 (a) A video signal from the scanner section (2-bit serial signal) is converted into 8-bit parallel signals and then stored in the frame memory, which is constituted by a DRAM;
 (b) Since the facsimile section has a transmission density of 7.7 lines per millimeter and 3.85 lines per millimeter, data are reduced by 50% by the scanner, then converted in density, and then stored in the memory;
 (c) A gate array for image processing cannot perform conversion except for the conversion from A3 size to B4 size and from B4 size to A4 size. In practice, however, a document is sometimes reduced to A4 size in the event of transmission as facsimile data. Therefore, in this embodiment, a video signal derived from an A3 document is changed in magnification by 84.6% to B4 size and then stored in the frame memory;
 (d) Subsequently, the data stored in the frame memory are sequentially transferred to FCP1 so as to deliver data to FPC2 via a serial port;
 (e) When the document is of B4 size and the facsimile paper used as the destination is of A4 size, the FPC2 reduces the data by 84% so as to store one frame data in a work RAM; and
 (f) Data compression for one frame of data is effected between the FCP2 and a work RAM2. The result of data compression is fed to a MODEM via an IOP2 so that modulated data are fed out to a line via the NCU.

(2) When data are stored in the memory and then transmitted as in the case of multiple address:
 (a) A video signal from the scanner section is temporarily stored in the frame memory and, subsequently, one frame of data are written in the work RAM1 via the FCP1. Then, the data are compressed between the FCP1 and the work RAM1, the resulting data being stored in the SAF memory;
 (b) To transmit the compressed data stored in the SAF memory, the data are read out and expanded between the FCP1 and the work RAM to restore the original data. These original data are serially delivered to the FCP2 and, by the game processing as in the case (2), sent out to the line.

(3) When data from the like are fed to the main control board:
 (a) A signal from the line is fed to the MODEM via the NCU, then demodulated, and then applied to the FCP2 via the IOP2;
 (b) The FCP2 expands the input signal to restore the original data and then applies them to the FCP1;
 (c) The FCP1 compresses the data again and stores the compressed data in the SAF memory. This re-compression is to cope with the compressing method which may differ from one facsimile terminal to another, i.e., to adopt the most efficient method for storing data in the SAF memory;
 (d) Upon completion of the reception, the compressed data stored in the SAF memory are expanded by the FCP1 and then transferred to the frame memory;
 (e) Upon the transfer of one page of data, a print command is fed to the main CPU to prepare for printout;
 (f) The data are fed out in synchornism with LSYNC, LGATE, FGATE and WCLK of IMAGIO 320F;
 (g) At this instant, since the frame memory stores data with the density of 7.7 lines per millimeter, the data are enlarged by two times (16 lines per millimeter) and, in addition, the parallel signals are converted into a serial signal (parallel-to-serial conversion).

The transition from the copy mode to the facsimile mode may occur in the following situations.

(1) When the operator desires to transmit data by using the facsimile:
 (a) The operator may operate the copy/facsimile selector lever 317 to pull out the facsimile display panel;

(b) Alternatively, the operator may operate the copy/facsimile selector switch 345. This results in any of two occurrences: (i) when the facsimile display panel 348 is not set, a message "SET FACSIMILE PANEL" appears on the liquid crystal display 304 because various kinds of setting necessary for transmission (usual character, small character, multimode, etc.) cannot be effected, and (ii) when the facsimile display panel 348 is set, the transition of mode is allowed.

When a document is left on the glass platen, it is discharged in the case of ADF mode or a warning is produced in the case of cover plate mode. This is to eliminate three undesirable occurrences: a person enters a telephone number for facsimile and then starts the scanner forgetting to load a document (the result is the transmission of a wrong document), a person inadvertently forgets to remove a document from the glass platen, and a person feeds a facsimile document by the ADF without removing a document which was copied in the cover plate mode (since most of facsimile documents are fed by the ADF, such causes damage to both of the documents).

In this particular embodiment, whether a document is present or not is not determined on the basis of CCD output. Specifically, a document is decided to be present when the print switch is pressed to effect prescanning which is adapted to detect a document size, when the print switch is pressed to start a copying operation, and when the start switch (print switch) is pressed to feed a document in the facsimile mode. When the ADF is lifted up, it is decided that a document is absent beneath the cover plate.

(2) When the facsimile control board completes reception and then the received data are printed out In this case, the transition to the facsimile mode occurs for printing out the data. Hence, as soon as the facsimile print-out is ended, the previous mode is restored: (a) stand-by mode (not operated for more than 30 seconds)→facsimile mode (print-out)→stand-by mode, (b) preheat mode→facsimile mode (print-out)→ preheat mode), and (c) main switch off mode→facsimile mode (print-out)→main switch off mode).

Usually, when the apparatus is used as a copier, the input mode from the operating section and the display are performed while, at the same time, image data read by the scanner are fed as a signal to the LD via the main control board so that a reproduction is produced under the control of the main CPU. In this instance, the facsimile section does not effect the copying operation at all. However, since the facsimile control (system control, protocol, image processing, etc.) is operable independently, data which may come in through the telephone line can be received even during copying, those data being written in the frame memory. When the copier is not operated for more than a predetermined period of time (more than 30 seconds in this embodiment), those received data are delivered from the facsimile control board to the main control board and then printed out.

Figure 29:
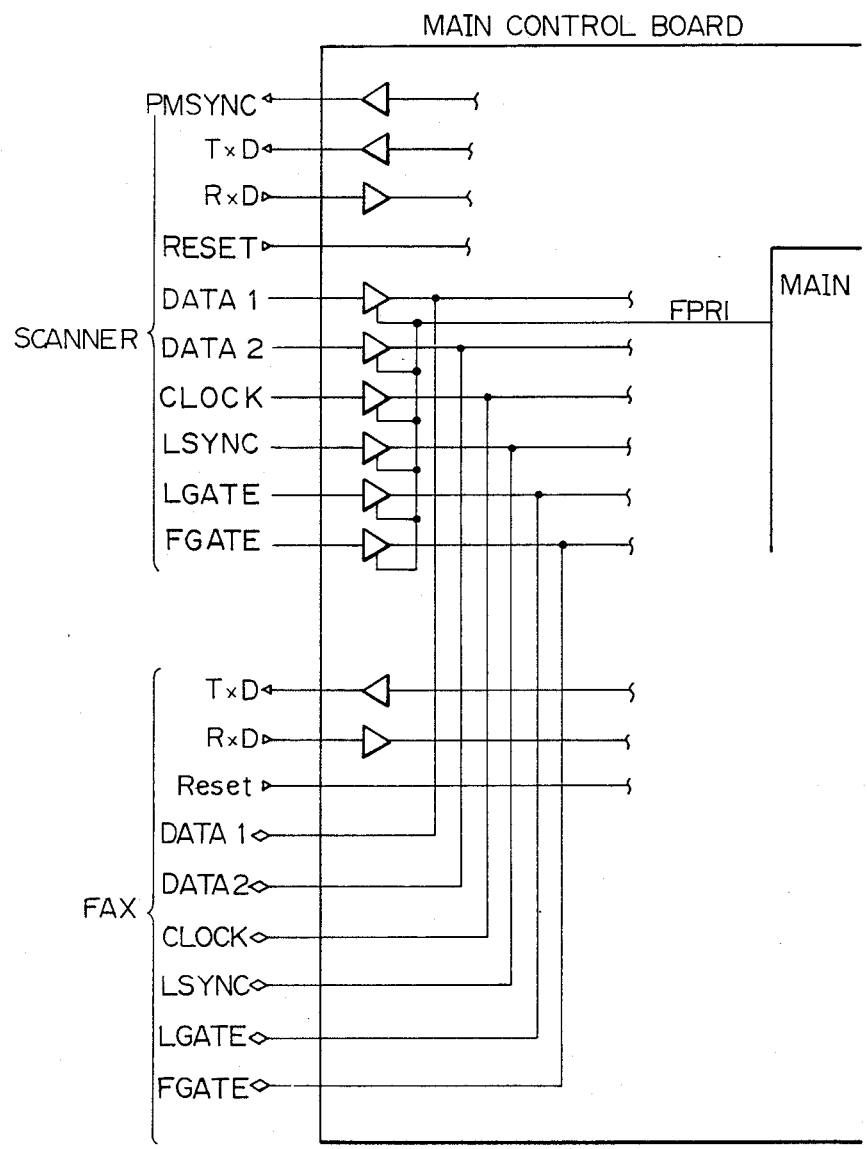
FIG. 29 is a diagram showing a circuit for causing a facsimile interface board, instead of a scanner, to deliver image data.

Referring to FIG. 29, there is shown a circuit for causing the facsimile interface board, instead of the scanner, to deliver image data when data are to be printed out from the facsimile interface. A FPRI signal is turned on when the facsimile interface produces a print start signal and turned off when the sequence control CPU produces a print stop signal.

When either the copy/facsimile selector lever or the selector switch is operated to condition the operating section for the facsimile mode, the sequence control in the operating section, scanner section and plotter section is executed by the facsimile section. At this time, the main control CPU performs setting of facsimile initial display particular to the changeover from the copy mode to the facsimile mode (operating section), system error checking (serial error, serviceman call, etc.), and the changeover of image data which in the event of facsimile reception causes image data from the facsimile interface to be applied to the main control to be printed out. Serial data from the operating section, scanner section and sequence section are fed to the system control CPU of the facsimile section via the main control CPU.

As stated above, the main control in the copy mode is not related with the facsimile control at all. Hence, the copier function alone is achievable by removing the selector lever 317 and switch 345 from the operating section as well as the facsimile control unit (communication circuit board 90, telephone 91, NCU 108, MODEM 117, facsimile interface board 118, etc. which are shown in FIGS. 8 and 9). It follows that when a user who purchased the apparatus with the copier function only desires to add the facsimile function to the apparatus, all that is required is adding the switch lever 317, switch 345 and facsimile control unit.

The exclusive counter 89 for facsimile is located as shown in FIG. 8 when the apparatus is used as a combined copier and facsimile apparatus. Facsimile data received are printed out with no regard to the intention of the owner of the apparatus. Hence, if the apparatus is equipped with the copy counter only and a system which charges a user for each copy (performance charge system), the number of papers which are printed with received facsimile data is unduly added to the number of usual copies. Especially, in the case that the number of copies produced is totalized on a department-by-department basis by using a key counter (inclusive of a key card), the absence of the exclusive facsimile counter 89 would disturb the totalization.

As described above, an apparatus of the present invention has various characteristic features as enumerated below:

(1) When the apparatus is not operated for more than a predetermined mode in a copy mode while it is used as a combined copier and facsimile apparatus, facsimile data which may be received are printed out. When no manipulation is performed during the print-out, the copy mode is restored at the end of the print-out.

(2) When facsimile data are received while preheating is under way, a facsimile mode is set up to print out the data. When no manipulation is performed during the print-out, a preheat mode is restored at the end of print-out.

(3) Even when a key counter (key card or the like) is not set, the transition to the facsimile mode is allowed for printing out facsimile data. Upon the transition to the facsimile mode, key counter display is turned off.

(4) In the case that a sorter is associated with the apparatus, a paper on which facsimile data are printed out is discharged to an interrupt tray. In the copy mode, this tray is used in the event of interruption. When the sorter has two bins, one of the bins is used as an exclusive copy tray and the other as an exclusive facsimile tray.

(5) When a counter other than a total counter is provided and this counter is associated with the facsimile section, it serves as an exclusive counter for counting papers which are produced in the facsimile mode. When the apparatus is used as a copier only, that counter serves as an exclusive copy counter.

(6) Use is made of an input mechanism in which a slidable panel switches the input pad surface. A switch mechanism is built in such an input mechanism. This allows a person to select either the copy mode or the facsimile mode merely by manipulating a facsimile/copy selector switch or the panel. If the slidable panel is not conditioned for the facsimile mode when the switch is manipulated, a warning is produced. Further, when the copy mode is replaced with the facsimile mode, the copy mode is saved; when the copy mode is restored, the copy mode saved is displayed.

(7) If a document fed by an ADF is left on a glass platen in the event of transition from the copy mode to the facsimile mode, it is discharged. In the case where the ADF is not used, a warning is produced. A person can select either the copy mode or the facsimile mode at the initial stage. If the apparatus is left unoperated for more than a predetermined period of time, the initial mode is set.

(8) Even when the key counter (key card) is not set, a person may set up the facsimile mode by operating the switch or the panel. Further, in the facsimile mode, the key counter display is turned off to allow facsimile data to be transmitted.

In summary, it will be seen that the present invention simplifies the operation for replacing a copy mode with a facsimile mode and replacing the latter with the former.

Various modifications will become possible for those skilled in the art after receiving the teachings of the present disclosure without departing from the scope thereof.

What is claimed is:

1. A copier with an optional facsimile function, comprising:
   mode selecting means;
   mode displaying means;
   mode display holding means; and
   control means for controlling said mode selecting means, said mode displaying means and said mode display holding means such that when said mode selecting means is operated to switch a copy mode to a facsimile mode, said mode display holding means holds the copy mode and, when said mode selecting means is operated to switch the facsimile mode back to the copy mode, said mode displaying means displays the mode which is held by said mode display holding means.

2. A copier with an optional facsimile function, comprising:
   mode selecting means;
   automatic document feeding means;
   document detecting means for determining whether or not an original document is present on a glass platen; and
   control means for controlling said mode selecting means, said automatic document feeding means and said document detecting means such that when an original document left on the glass platen is detected by said document detecting means when said mode selecting means is operated to switch a copy mode to a facsimile mode, said automatic document feeding means discharges said document in response to an output signal of said document detecting means.

3. A copier with an optional facsimile function, comprising:
   mode selecting means;
   a cover plate for pressing a document which is laid on a glass platen;
   document detecting means for determining whether or not an original document is present on the glass platen;
   warning means; and
   control means for controlling said mode selecting means, said document detecting means and said warning means such that if an original document left on the glass platen is detected by said document detecting means when said mode selection means is operated to switch a copy mode to a facsimile mode, said warning means produces a warning indicative of the presence of the document.

4. A copier according to claim 3 wherein said mode selecting means functions to select one of a copy and a facsimile mode at an initial condition of said copier.

5. In a method of controlling a copier with an optional facsimile function, the improvement wherein an initial mode selected from a facsimile mode and a copier mode is automatically recovered when said copier is not operated for more than a predetermined period of time.

6. The improvement as claimed in claim 5, wherein a key counter removable from said copier, a mounting section for mounting said key counter, and a display section capable of displaying absence of said key counter, and mode selecting means are further provided, said display section on which the absence of said key counter is indicated being turned off when said mode selection means is operated to select a facsimile mode, thereby allowing data to be transmitted.

7. A copier with an optional facsimile function, comprising:
   a copy display panel having a group of keys arranged thereon which are usable in a copy mode;
   a facsimile display panel having a group of keys arranged thereon which are usable in a facsimile mode, said facsimile display panel being slidingly movable between a first position where said facsimile display panel covers said copy display panel and a second position where said facsimile display panel is not visible;
   detecting means for detecting that said facsimile display panel is located n the first position; and
   control means for selecting a facsimile mode when said detecting means detects that said facsimile display panel is in the first position, while selecting a copy mode when otherwise.

8. A copier as claimed in claim 7, wherein said facsimile display panel is removably mounted on said copier.

9. A copier as claimed in claim 7, further comprising a lever for moving said facsimile display panel between the first position and the second position.

10. A copier as claimed in claim 9, wherein said lever is removably mounted on said copier.

11. A copier as claimed in claim 9, said detecting means comprising a sensor which is turned on and off by said lever.

12. A copier as claimed in claim 7, further comprising:
   a pressable mode selecting switch; and
   slidable mode selecting means;
   said control means switching one of the copy mode and the facsimile mode t the other when said mode selecting switch is pressed.

13. A copier as claimed in claim 12, wherein the group of keys of said facsimile display panel include keys which are essential to the facsimile mode.

14. A copier as claimed in claim 13, further comprising warning means, said control means controlling said warning means such that if said mode selecting means has not been conditioned for the facsimile mode when said mode selecting switch is operated to select the facsimile mode in place of the copy mode, said warning means shows that the facsimile mode is not set up.

* * * * *

UNITED STATES PATENT AND TRADEMARK OFFICE
CERTIFICATE OF CORRECTION

PATENT NO. : 4,905,098
DATED : February 27, 1990
INVENTOR(S) : Seiji Sakata It is certified that error appears in the above-identified patent and that said Letters Patent is hereby corrected as shown below:

Title page, in the drawing sheets, delete "30" and insert --35--.

Signed and Sealed this

Tenth Day of September, 1991

Attest:

HARRY F. MANBECK, JR.

*Attesting Officer*                    *Commissioner of Patents and Trademarks*